(12) United States Patent
Muraoka et al.

(10) Patent No.: US 6,777,631 B2
(45) Date of Patent: Aug. 17, 2004

(54) PANEL-TYPE PERIPHERAL DEVICE AND METHOD OF PRODUCING THE SAME

(75) Inventors: Tooru Muraoka, Tokyo (JP); Sayoko Fushimi, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 425 days.

(21) Appl. No.: 09/915,578

(22) Filed: Jul. 27, 2001

(65) Prior Publication Data

US 2002/0011992 A1 Jan. 31, 2002

(30) Foreign Application Priority Data

| Jul. 27, 2000 | (JP) | ........................................ 2000-231418 |
| Mar. 19, 2001 | (JP) | ........................................ 2001-079055 |
| Jun. 18, 2001 | (JP) | ........................................ 2001-183779 |

(51) Int. Cl.[7] .............................................. H01H 1/02
(52) U.S. Cl. ........................ 200/268; 200/269; 200/512
(58) Field of Search ................................. 200/262, 263, 200/265, 268, 269, 270, 512, 515, 517

(56) References Cited

U.S. PATENT DOCUMENTS 5,179,460 A * 1/1993 Hinata et al. ................ 349/147
5,973,283 A * 10/1999 Ariga et al. ................. 200/512
6,054,664 A * 4/2000 Ariga et al. ................. 200/512
6,462,294 B2 * 10/2002 Davidson et al. ........... 200/512

\* cited by examiner

Primary Examiner—Lincoln D. Donovan
Assistant Examiner—K. Lee
(74) Attorney, Agent, or Firm—Staas & Halsey LLP

(57) ABSTRACT

A panel-type peripheral device including first and second conductive panel members, each panel member being provided with an insulating substrate and a conductive film applied on the insulating substrate, is produced. First, a panel assembly, including the first and second conductive panel members fixed to each other with the respective conductive films thereof oppositely facing to each other through a gap defined therebetween, is securely held between first and second support members of a panel support unit. The panel assembly held by the panel support unit is placed, together with a receptacle accommodating a liquid material, in a common environment. Next, the pressure of the common environment is reduced while a passage formed in the panel assembly to communicate with the gap is exposed to the environment, so as to evacuate the gap in the panel assembly. Then, the passage of the panel assembly is immersed in the liquid material. During this state, the pressure of the environment is increased, so that the gap in the panel assembly is entirely filled with the liquid material, without deforming the first conductive panel member toward the second conductive panel member.

25 Claims, 18 Drawing Sheets

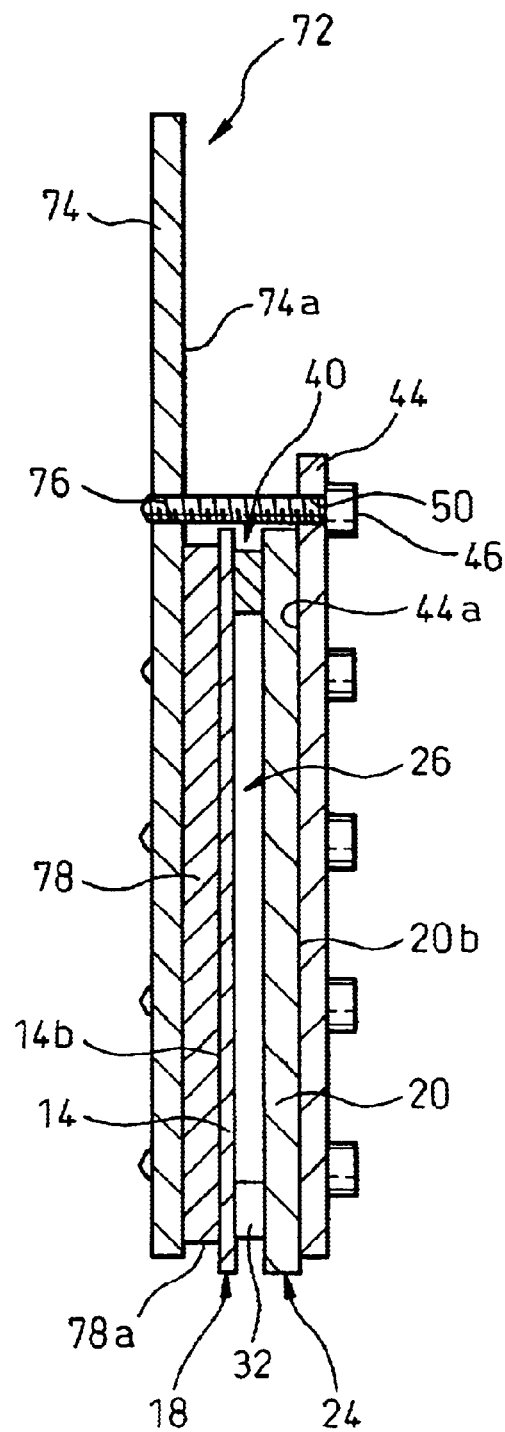

PANEL-TYPE PERIPHERAL DEVICE AND METHOD OF PRODUCING THE SAME

BACKGROUND OF THE INVENTION

1. Field of the Invention

The present invention relates, generally, to a peripheral device for electronic equipment and, more particularly, to a panel-type or panel-shaped peripheral device constructed as, e.g., an input or display unit. The present invention also relates to a method of producing such a panel-type peripheral device, as well as to certain equipment usable for performing the producing method.

2. Description of the Related Art

Recently, in the technical field of digital data processors with displays, such as personal computers, word processors, electronic notebooks, personal digital assistants (PDAS), etc., a panel-type or panel-shaped input unit, referred to as a touch panel, adapted to be arranged over a screen of a display unit, such as a liquid crystal display (LCD), a plasma display panel (PDP), a cathode ray tube (CRT), has been widely used. In the panel-type input unit or touch panel, an operator presses with his finger or a pen on a desired point on a panel surface, and thereby enters or directs two-dimensional coordinate data on the display screen.

The conventional touch panel includes a pair of plate-shaped detecting elements or conductive panel members, each of which is provided with a transparent insulating substrate and a transparent conductive film formed on the surface of the insulating substrate. The detecting elements are fixed together, in a state where the conductive films thereof oppositely face to each other through a certain gap, by a strip-shaped adhesive layer provided to extend along the outer peripheries of the opposed insulating substrates. The gap between the detecting elements is obtained due to the adhesive layer and a large number of dot spacers dispersedly arranged on the surface of the conductive film of one detecting element. The dot spacers serve to prevent each detecting element from being deformed at least due to its own weight so as to maintain the gap between the detecting elements, while permitting the conductive films to come into contact with each other when either one of the detecting elements is deformed by an external pressing force. Typically, the insulating substrate of the upper detecting element adapted to be pressed by the operator is made of a resinous film to meet the requirement of flexibility, and the insulating substrate of the lower detecting element adapted to be disposed adjacent to a display screen is made of a glass pane, a plastic plate, a resinous film, etc.

Another touch panel including the above-described basic structure has been also known, wherein a transparent insulating liquid material having a refractive index equivalent to that of each detecting element is filled and sealed in the gap between the pair of detecting elements so as to improve the optical transmittance of the touch panel and thus improve the visibility of a display screen. Such a liquid-sealing touch panel has a structure similar to a liquid crystal cell of a conventional LCD. Therefore, it is possible to pour the liquid material into the gap between the detecting elements in a way similar to a liquid-crystal pouring operation in a conventional process for manufacturing the LCD.

The liquid-crystal pouring operation in the conventional LCD manufacturing process includes following steps. First, a panel assembly is provided, in which a pair of electrode plates or conductive panel members, each including an insulating substrate and a conductive film formed on one surface of the insulating substrate, are fixed to each other in a state where the respective conductive films of the electrode plates oppositely face to each other through a certain gap. The panel assembly is an unfilled liquid crystal cell, in a condition before the liquid crystal is poured, and is referred to, e.g., as an empty cell. The pair of electrode plates are fixed together by a strip-shaped adhesive layer provided between the mutually opposing surfaces of the insulating substrates of the electrode plates to extend along the outer peripheries of the insulating substrates. A passage is formed adjacent to the adhesive layer as, e.g., a cut-out portion of an adhesive, for communicating the gap between the electrode plates to an environment outside of the empty cell. The adhesive layer serves to hermetically seal the gap between the electrode plates against the outside environment at a region other than the passage.

Next, a receptacle accommodating a liquid crystal material is provided, and the receptacle and the panel assembly as described are placed in a common outside environment, such as a sealed chamber. Then, the sealed chamber is evacuated to depressurize the outside environment while the passage formed in the panel assembly is exposed to the outside environment, so as to evacuate the gap between the electrode plates of the panel assembly and to vacuum-degas the liquid crystal material. Subsequently, the passage of the panel assembly and the area adjacent thereto are immersed into the liquid crystal material in the receptacle under the outside environment as depressurized. At this time, the liquid crystal material slightly permeates into the gap between the electrode plates through the passage in the panel assembly due to a capillary action. Thereafter, an inert gas is introduced into the sealed chamber to increase a pressure therein, and thereby entirely filling the gap with the liquid crystal material.

When a procedure similar to the above-described liquid-crystal pouring operation in the conventional LCD manufacturing process is applied to the liquid pouring operation in the liquid-sealing touch panel as described, which is constructed by assembling the upper detecting element including a resinous-film insulating substrate and the lower detecting element including a glass-pane insulating element, the upper detecting element tends to be bent toward the lower detecting element due to a pressure rise during the time when the insulating liquid material is filled into the gap in the panel assembly by increasing the pressure of the outside environment. If such a deformation is caused in one of the detecting elements of the panel assembly in a liquid filling step, the gap between the detecting elements is narrowed, which may result in a difficulty in the rapid filling of the insulating liquid material entirely into the gap, and may cause a touch panel, as a finished product after the filling step is completed, to have a slightly concave center area of the upper detecting element relative to the outer peripheral area thereof. Such a concave upper detecting element may result in a distortion in a transmitted image through the touch panel especially in an area adjacent to the outer periphery thereof, as well as may result in an indeterminately separated state of the detecting elements after they separate from each other for conduction at a pressed point.

It may be predicted that the above-described problems remarkably arise in the case where both detecting elements of the touch panel include resinous-film insulating substrates. Also, it may be predicted that the concave center area of a flexible conductive panel member is generated, during a liquid material pouring operation, not only in the liquid-sealing touch panel, but also in various liquid-sealing panel-type peripheral devices, such as a liquid crystal display using a resinous-film substrate, wherein at least one of the conductive panel members of a panel assembly has a flexibility for permitting a relatively easy deformation due to a pressure fluctuation in the outside environment.

In the above-described liquid pouring operation, the panel assembly and the liquid material are placed in a depressurized environment in the step of pouring the liquid material into the gap between the conductive panel members of the panel assembly, so that it is a precondition that a liquid material having a sufficiently low vapor pressure, such as a silicone oil, is used. Accordingly, the range of selection of the liquid material is narrow, and thereby the structural optimization of the panel-type peripheral device, such as a selection of the liquid material having a chemical stability in relation to the materials of various components of the panel assembly, may be restricted.

Incidentally, in the conventional liquid-sealing panel-type peripheral device, the passage for pouring the liquid material, formed between the pair of conductive panel members adjacent to the adhesive layer, linearly extends and has a uniform cross-section, in general, between an interior port opening to the gap between the conductive panel members and an exterior port opening to the outside environment. The passage of this shape has an advantage that, in the case where the adhesive layer is formed by a pressure sensitive adhesive double-coated tape, it is possible to significantly easily form the passage by a cut-out portion of the double-coated tape. However, the conductive panel members are not fixed to each other in the region of the passage, so that, in the case where one of the conductive panel members or detecting elements includes a resinous-film insulating substrate, such as in the touch panel, it may be difficult to securely hold this conductive panel member in the vicinity of the passage.

Particularly, it is required, in the touch panel, that the upper detecting element to be pressed for operation is securely held while a uniform tension is entirely applied thereto, so as to ensure that data is accurately and stably entered irrespective of a pressed position. Therefore, it is preferred that the passage for pouring the liquid material is formed as narrow as possible, but the reduction of the cross-section of the passage may increase the time required for the operation of filling the liquid material. In this respect, it may be advisable that plural narrow passages are dispersedly formed at certain positions, but this arrangement may complicate a passage sealing operation performed after the liquid material filling operation is finished.

SUMMARY OF THE INVENTION

It is therefore an object of the present invention to provide a method of producing a panel-type peripheral device including a pair of conductive panel members and a liquid material filled and sealed in a gap between the conductive panel members, wherein, even when at least one of the conductive panel members has a flexibility for permitting a relatively easy deformation due to a pressure fluctuation in an outside environment, it is possible to quickly and entirely fill the gap between the conductive panel members with the liquid material in a liquid material pouring operation, without generating a concave center area of the flexible conductive panel member.

It is another object of the present invention to provide a method of producing a panel-type peripheral device including a pair of conductive panel members and a liquid material filled and sealed in a gap between the conductive panel members, wherein it is possible to select various liquid materials without being restricted by a vapor pressure, and thus to facilitate the structural optimization of the peripheral device.

It is still another object of the present invention to provide certain equipment preferably usable for performing the above-described producing method.

It is further object of the present invention to provide a panel-type peripheral device produced by above-described producing method, which exhibits a superior functionality, and particularly, to provide a touch panel ensuring little distortion in a transmitted image as well as an accurate and stable entering operation.

It is still further object of the present invention to provide a panel-type peripheral device, particularly a touch panel, including a pair of conductive panel members and a liquid material filled and sealed in a gap between the conductive panel members, wherein it is possible to prevent a function thereof from being deteriorated due to the existence of a passage for pouring the liquid material, without complicating a liquid filling operation and a passage sealing operation.

In accordance with the present invention, there is provided a method of producing a panel-type peripheral device including a pair of conductive panel members, each conductive panel member being provided with an insulating substrate and a conductive film on a first side of the insulating substrate, comprising providing a panel assembly including the pair of conductive panel members fixed to each other with respective conductive films thereof oppositely facing to each other through a gap defined therebetween, the panel assembly having a passage for communicating the gap with an environment outside of the panel assembly, the gap being hermetically sealed against the environment at a region other than the passage; providing a support member having a rigidity higher than that of at least one of the conductive panel members of the panel assembly, the support member including a support surface larger than a second side of the insulating substrate, opposite to the first side, of the at least one of conductive panel members; providing a receptacle accommodating a liquid material; placing the panel assembly, the support member and the receptacle in a common environment; securely arranging the support member over and adjacent to the at least one of conductive panel members of the panel assembly with the support surface oppositely facing to the second side of the insulating substrate; depressurizing the common environment while the passage of the panel assembly is exposed to the common environment, to evacuate the gap in the panel assembly; immersing the passage of the panel assembly into the liquid material in the receptacle under the common environment as depressurized; and increasing a pressure of the common environment as depressurized, to cause a flow of the liquid material from the receptacle into the gap in the panel assembly through the passage, and to fill the gap with the liquid material, without directly applying the pressure of the common environment onto the at least one of conductive panel members arranged adjacent to the support member.

In this method, it is preferred that the step of securely arranging the support member over and adjacent to the at least one of conductive panel members of the panel assembly includes defining a second gap between the support surface of the support member and the second side of the insulating substrate of the at least one of conductive panel members, that the step of depressurizing the common environment includes communicating the second gap to the common environment, and that the step of increasing the pressure of the common environment includes hermetically sealing the second gap against the common environment.

Also, in this method, it is advantageous that the at least one of conductive panel members of the panel assembly, securely arranged over and adjacent to the support member, has a flexibility for permitting a relatively easy deformation due to a pressure fluctuation in the common environment.

The present invention also provides a panel-type peripheral device produced by the above-described method.

The present invention also provides a panel support unit comprising the support member provided in the above-described method.

The panel support unit may further comprise a second support member cooperating with the support member to securely support the panel assembly.

The present invention also provides a panel support unit comprising the support member provided in the above-described method; a vent hole for communicating the second gap with the common environment; and a valve member capable of opening and closing the vent hole in response to a pressure fluctuation in the common environment.

In another aspect of the present invention, there is provided a method of producing a panel-type peripheral device including a pair of conductive panel members, each conductive panel member being provided with an insulating substrate and a conductive film on a first side of the insulating substrate, comprising providing a panel assembly including the pair of conductive panel members fixed to each other with respective conductive films thereof oppositely facing to each other through a gap defined therebetween, the panel assembly having a passage for communicating the gap with an environment outside of the panel assembly, the gap being hermetically sealed against the environment at a region other than the passage, at least one of the conductive panel members having a flexibility for permitting a relatively easy deformation due to a pressure fluctuation in the environment; providing a partition wall including a through opening, into which a part of the panel assembly is capable of being fitted in a hermetically sealed manner; fitting the part of the panel assembly into the through opening of the partition wall, in a hermetically sealed manner, in such a manner that the passage of the panel assembly opens to one side of the partition wall, and that major parts of the conductive panel members of the panel assembly are located in another side of the partition wall; placing a liquid material in the one side of the partition wall; immersing an open portion of the passage of the panel assembly, fitted into the through opening of the partition wall, into the liquid material; increasing a pressure of an environment in the other side of the partition wall to deform the at least one of the conductive panel members of the panel assembly, to evacuate the gap in the panel assembly; and decreasing a pressure of the environment in the other side of the partition wall to deform the at least one of conductive panel members of the panel assembly, to cause a flow of the liquid material from the one side of the partition wall into the gap in the panel assembly through the passage, and to fill the gap with the liquid material.

In this method, it is preferred that the partition wall includes a plurality of through openings, into which respective parts of a plurality of panel assemblies are capable of being fitted in a hermetically sealed manner, and that the gap of each of the panel assemblies is simultaneously filled with the liquid material.

The present invention also provides a panel-type peripheral device produced by the above-described method.

The present invention also provides a liquid pouring system comprising the partition wall provided in the above-described method.

The liquid pouring system may further comprise a liquid-material storing vessel provided in the one side of the partition wall, a pressure regulating chamber provided in the other side of the partition wall, and a support mechanism for securely supporting the panel assembly in a state where the part of the panel assembly is fitted into the through opening of the partition wall.

In a further aspect of the present invention, there is provided a method of producing a panel-type peripheral device including a pair of conductive panel members, each conductive panel member being provided with an insulating substrate and a conductive film on a first side of the insulating substrate, comprising: providing a panel assembly including the pair of conductive panel members fixed to each other with respective conductive films thereof oppositely facing to each other through a gap defined therebetween, the panel assembly having a passage for communicating the gap with an environment outside of the panel assembly, the gap being hermetically sealed against the environment at a region other than the passage; providing a wall including a through opening, into which a part of the panel assembly is capable of being fitted; fitting the part of the panel assembly, into the through opening of the wall, in such a manner that the passage of the panel assembly opens to one side of the wall; depressurizing an environment in both sides of the wall to a vacuum condition; placing a liquid material in the one side of the wall to immerse an open portion of the passage of the panel assembly into the liquid material; and flowing the liquid material from the one side of the wall into the gap in the panel assembly through the passage by a function of gravity, to fill the gap with the liquid material.

In this method, it is preferred that the wall includes a plurality of through openings, into which respective parts of a plurality of panel assemblies are capable of being fitted, and that the gap of each of the panel assemblies is simultaneously filled with the liquid material.

Also, in this method, it is preferred that the wall is capable of closing between the one side and the other side in a hermetically sealed manner, and further comprises a step of varying a pressure of the environment in the other side of the wall, after the gap of the panel assembly is filled with the liquid material, to adjust a volume of the liquid material in the gap.

The present invention also provides a panel-type peripheral device produced by the above-described method.

The present invention also provides a liquid pouring system comprising the wall provided in the above-described method.

The liquid pouring system may further comprise a liquid-material storing vessel provided in the one side of the wall, a pressure regulating chamber continuously formed around the wall and the liquid-material storing vessel, and a support mechanism for securely supporting the panel assembly in a state where the part of the panel assembly is fitted into the through opening of the wall.

In the above-described various methods, the panel-type peripheral device may have a configuration of a touch panel including a pair of detecting elements as the pair of conductive panel members, each detecting element being provided with a transparent insulating substrate and a transparent conductive film on a first side of the insulating substrate, and at least one of the detecting elements of the panel assembly, securely arranged over and adjacent to the support member, may have a flexibility for permitting a relatively easy deformation due to a pressure fluctuation in the common environment, and the liquid material may be a transparent insulating liquid material.

In a yet further aspect of the present invention, there is provided a panel-type peripheral device comprising a pair of insulating substrates spaced from and opposed to each other; a pair of conductive films respectively formed on opposed surfaces of the insulating substrates to face oppositely to each other through a gap; an adhesive sealing member for sealing the gap against an outside environment and fixing the insulating substrates with each other; and a liquid material filled and sealed in the gap; wherein the adhesive sealing member includes a strip-shaped adhesive layer laminated on the opposed surfaces of the insulating substrates to extend along outer peripheries of the insulating substrates; at least one passage formed adjacent to the adhesive layer for pouring the liquid material into the gap; a sealant for sealing the at least one passage; each of the at least one passage being provided with one exterior port opening to the outside environment and at least one interior port independently opening to the gap, each interior port having an opening area smaller than the exterior port.

BRIEF DESCRIPTION OF THE DRAWINGS

The above and other objects, features and advantages of the present invention will become more apparent from the following description of preferred embodiments in connection with the accompanying drawings, in which:

FIG. 7 is an assembled sectional view showing a panel support unit, according to another embodiment of the present invention, while being attached to the panel assembly;

DESCRIPTION OF THE PREFERRED EMBODIMENT

Figure 1:
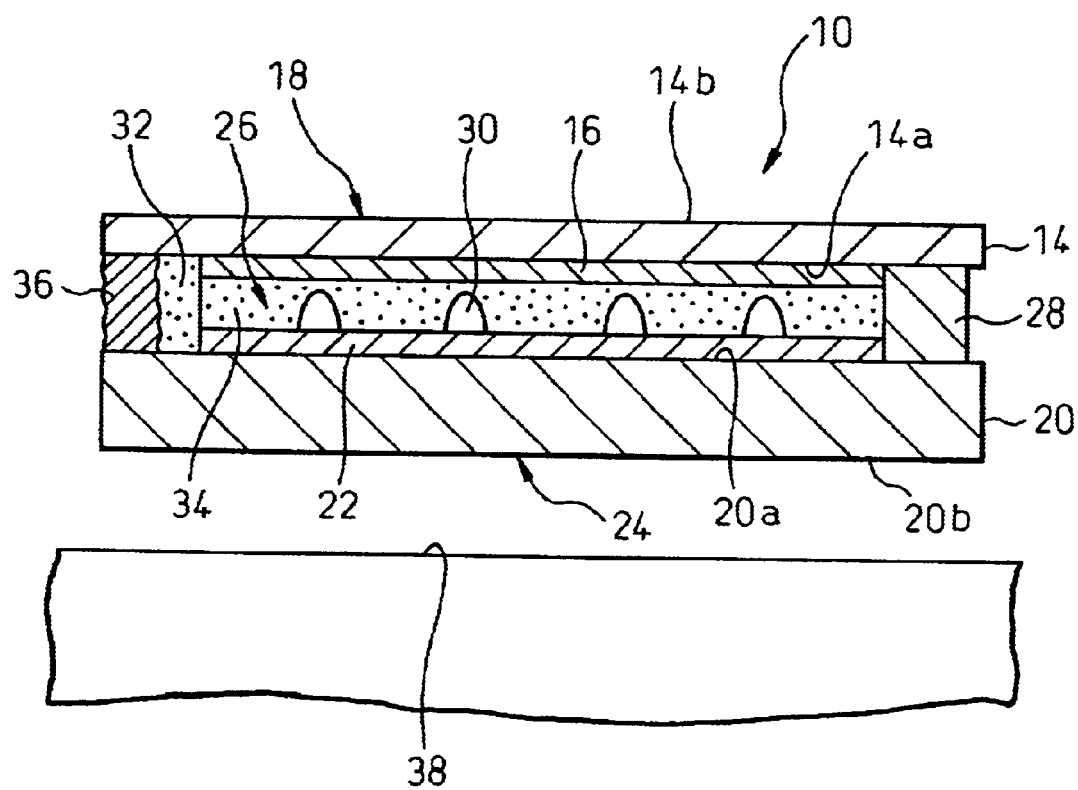
FIG. 1 is a sectional view showing a panel-type peripheral device according to one embodiment of the present invention with an enlarged and emphasized scale in thickness.
Figure 2:
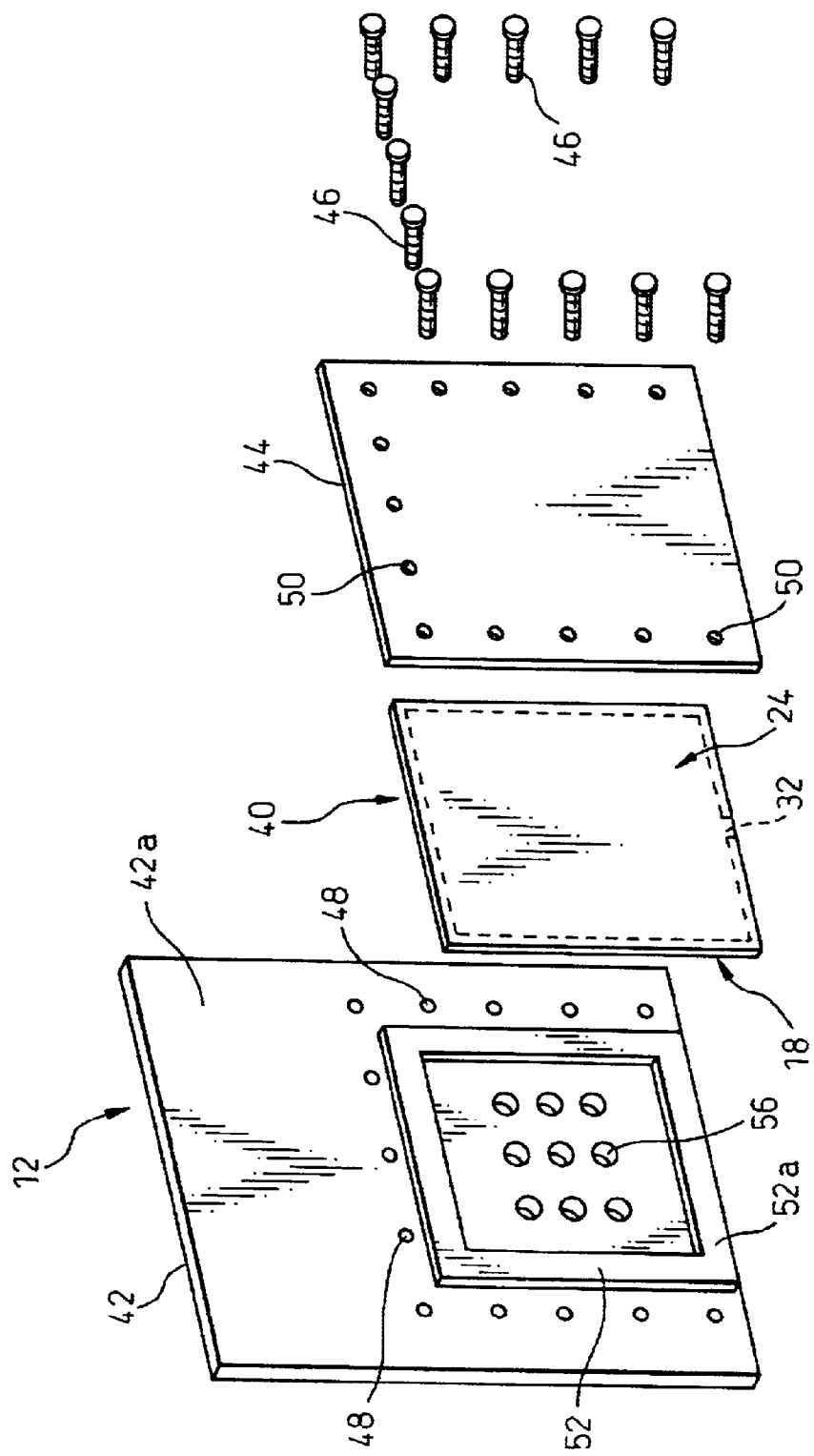
FIG. 2 is an exploded perspective view showing a panel support unit used in a method of producing a panel-type peripheral device according to one embodiment of the present invention, together with a panel assembly of the objective panel-type peripheral device.
Figure 3:
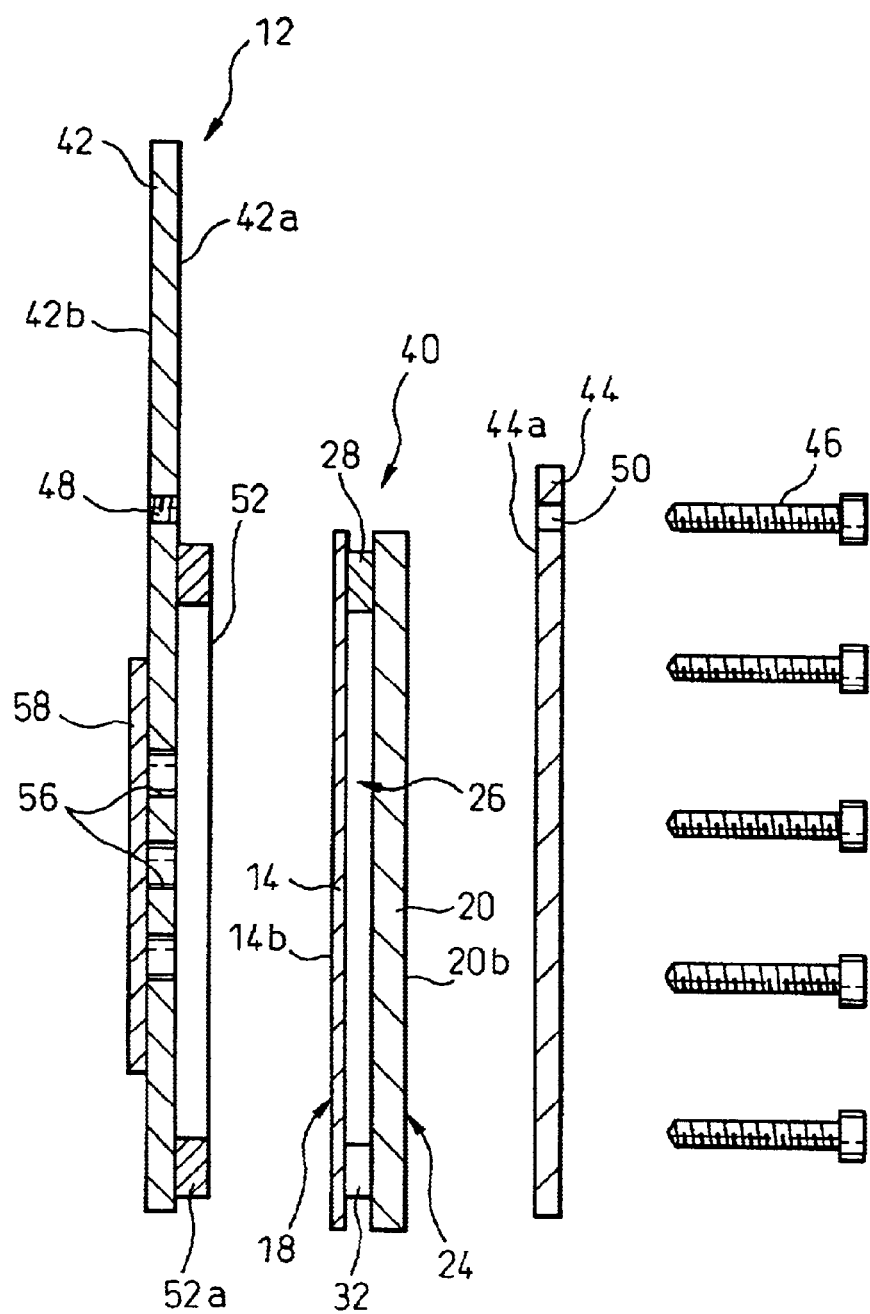
FIG. 3 is an exploded sectional view showing the panel support unit of FIG. 2 together with the panel assembly.
Figure 4:
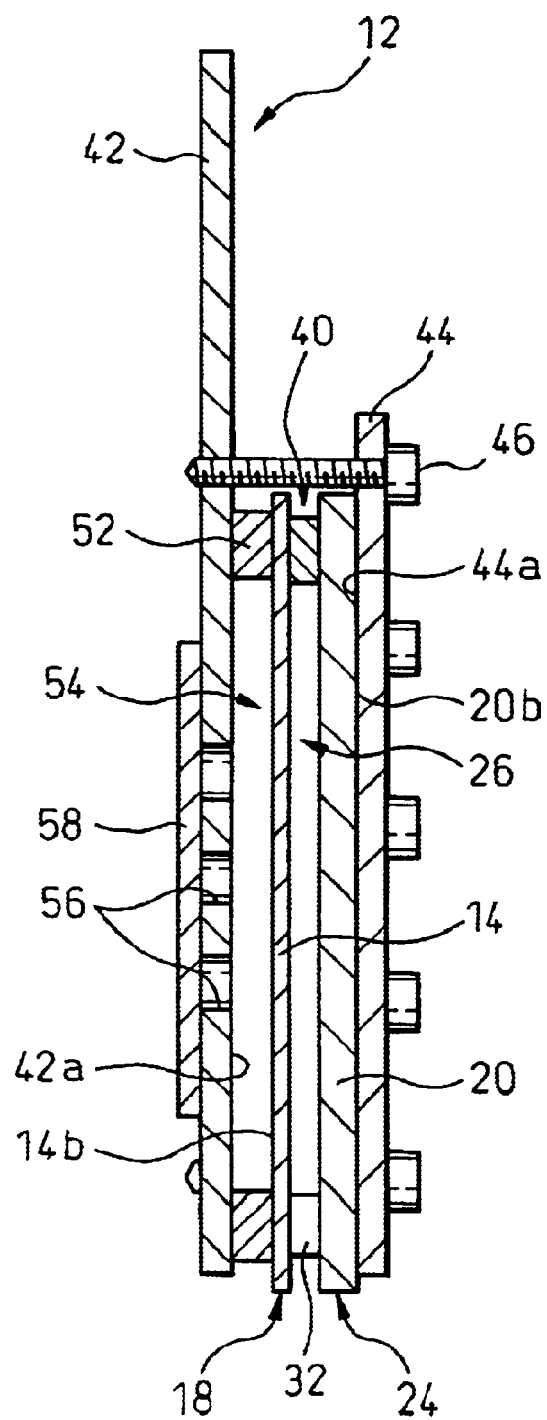
FIG. 4 is an assembled sectional view showing the panel support unit of FIG. 2 while being attached to the panel assembly.

Referring now to the drawings, in which the same or similar components are denoted by common reference numerals, FIG. 1 diagrammatically shows a general structure of a panel-type peripheral device 10, produced through a panel-type peripheral device producing method according to one embodiment of the present invention, with an enlarged and emphasized scale in thickness, and FIGS. 2 to 4 respectively show a panel support unit 12 used in the panel-type peripheral device producing method, together with the unfilled or unfinished structure of the panel-type peripheral device 10.

The panel-type peripheral device 10 includes a first electrically conductive panel member 18 provided with an electrically insulating substrate 14 and an electrically conductive film 16 formed on a first side 14a of the insulating substrate 14, and a second electrically conductive panel member 24 provided with an electrically insulating substrate 20 and an electrically conductive film 22 formed on a first side 20a of the insulating substrate 20. The first and second conductive panel members 18, 24 are flat plates having rectangular profiles generally identical to each other, and also the conductive films 16, 22 thereof have rectangular profiles generally identical to each other. The conductive panel members 18, 24 are mutually fixed, one on top of the other, in a state where the respective conductive films 16, 22 thereof oppositely face to each other through a gap 26 defined therebetween, by a strip-shaped adhesive layer 28 provided to extend on the respective first side 14a, 20a along the outer peripheries of the opposed insulating substrates 14, 20.

The adhesive layer 28 is made of a pressure sensitive adhesive double-coated tape formed into a rectangular frame shape and having a predetermined thickness. The adhesive layer 28 cooperates with a large number of dot spacers 30 dispersedly arranged on the surface of the conductive film 22 of the second conductive panel member 24, so as to surely obtain the gap 26 between the conductive panel members 18, 24. One passage 32 is formed adjacent to the adhesive layer 28 as, e.g., a cut-out portion of the pressure sensitive adhesive double-coated tape, for communicating the gap 26 between the conductive panel members 18, 24 to an environment outside of the panel-type peripheral device 10. The adhesive layer 28 serves, in addition to a function for fixing the conductive panel members, to hermetically seal the gap 26 between the conductive panel members 18, 24 against the outside environment at a region other than the passage 32. A liquid material 34, having a predetermined function, is filled and sealed in the gap 26 between the conductive panel members 18, 24. The passage 32 is sealed up with a sealant (e.g., an adhesive) 36 after the liquid material 34 is poured into the gap 26 through a liquid pouring process as described later.

In the illustrated preferred embodiment, the first conductive panel member 18 is formed by laminating the transparent conductive film 16 on the insulating substrate 14 made of a transparent resinous film, and thus inherently has a flexibility for enabling the panel member 18 to be relatively easily deformed due to a pressure fluctuation in the outside environment. On the other hand, the second conductive panel member 24 is formed by laminating the transparent conductive film 22 on the insulating substrate 20 made of a transparent glass pane, and thus inherently has a rigidity for enabling the panel member 24 to maintain the original shape thereof against a pressure fluctuation in the outside environment. Therefore, the pane-type peripheral device 10 can act as a touch panel that is an input unit in a digital data processor.

In the panel-type peripheral device 10 constructed as the touch panel, the first conductive panel member 18 acts as an upper detecting element adapted to be pressed by an operator for operation, and the second conductive panel member 24 acts as a lower detecting element adapted to be disposed on or adjacent to a display screen 38, such as an LCD, a PDP or a CRT. The dot spacers 30 serve to prevent the first conductive panel member or upper detecting element 18 from being deformed at least due to its own weight so as to maintain the gap 26, while permitting the conductive films 16, 22 to come into contact with each other in a conductive manner when the first conductive panel member or upper detecting element 18 is deformed by an external pressing force. Moreover, the liquid material 34 is made of a transparent insulating liquid material having a refractive index equivalent to that of each conductive panel member or detecting element 18, 24, and serves to improve the optical transmittance of the touch panel 10.

The first and second conductive panel members 18, 24 are further provided with first and second conductive lines (not shown) respectively patterned on the first side 14a, 20a of the insulating substrates 14, 20 so as to be electrically connected to the respective conductive films 16, 22. The first and second conductive lines respectively include first and second pairs of electrodes (not shown) arranged along the respective opposed edges of the conductive films 16, 22 with one electrode pair being shifted in a right angle from the other electrode pair, and first and second wiring strips (not shown) respectively connected with the first and second electrode pairs. Such a structure is known as a resistance-film type touch panel.

The panel support unit 12 adapted to be used in the producing method (especially, in the liquid pouring process) of the above-described panel-type peripheral device 10 has a configuration for securely or fixedly supporting a panel assembly 40 that is the unfilled or unfinished structure of the panel-type peripheral device 10, in a condition before the liquid material 34 is poured into the gap 26 between the conductive panel members 18, 24. The panel support unit 12 includes a flat plate-shaped first support member 42 having a rigidity or stiffness higher than that of the first conductive panel member 18 of the panel assembly 40 or, preferably, a rigidity for enabling the support member 42 to maintain the original shape thereof against a pressure fluctuation in the outside environment, and a second support member 44 cooperating with the first support member 42 to securely or fixedly hold the panel assembly 40 therebetween. The first support member 42 includes a flat support surface 42a sufficiently larger than a second side 14b opposite to the first side 14a of the insulating substrate 14 of the first conductive panel member 18. Also, the second support member 44 includes a flat support surface 44a somewhat larger than a second side 20b opposite to the first side 20a of the insulating substrate 20 of the second conductive panel member 24.

The first and second support members 42, 44 hold the panel assembly 40 therebetween, and are fixed in this state with each other by a plurality of bolts 46 dispersedly arranged around the panel assembly 40. The first and second support members 42, 44 are provided at corresponding locations with plural internal thread holes 48 and plural through holes 50, respectively, and each bolt 46 is inserted through each through hole 50 and screwed into the corresponding internal thread hole 48. A rectangular frame-shaped spacer 52 is securely provided on the support surface 42a of the first support member 42 and inside the plural internal thread holes 48 disposed in a rectangular array. The spacer 52 is preferably formed from a rubber packing, and is shaped and dimensioned in such a manner as to be capable of closely contacting with the second side 14b of the insulating substrate 14 of the first conductive panel member 18 of the panel assembly 40 along the outer periphery of the insulating substrate 14. One straight part 52a of the spacer 52 is placed along one edge (a bottom edge in the drawing) of the support surface 42a of the first support member 42.

The panel assembly 40 is securely held between the support members 42, 44 of the panel support unit 40 in a state where the second side 14b of the insulating substrate 14 of the first conductive panel member 18 oppositely faces the support surface 42a of the first support member 42 and hermetically contacts with the spacer 52 over the entire length of the latter, and the second side 20b of the insulating substrate 20 of the second conductive panel member 24 abuts the support surface 44a of the second support member 44. At this time, the panel assembly 40 is positioned or oriented so that the passage 32 communicating to the gap 26 between the conductive panel members 18, 24 is exposed to the outside of the panel support unit 12 from the straight part 52a of the spacer 52. During the time when the panel support unit 12 is mounted to the panel assembly 40 in this manner, a second gap 54 is defined between the second side 14b of the insulating substrate 14 of the first conductive panel member 18 and the support surface 42a of the first support member 42.

The panel support unit 12 further includes a plurality of vent holes 56 for communicating the second gap 54 with the outside environment during the time when the panel support unit securely hold the panel assembly 40, and a valve member 58 for opening/closing the vent holes 56 in response to the pressure fluctuation in the outside environment. The vent holes 56 are formed to penetrate through the first support member 42 at predetermined locations inside the spacer 52. The valve member 58 is preferably formed from, e.g., a rubber sheet, and is affixed to a back surface 42b opposite to the support surface 42a of the first support member 42 at a location for hiding the vent holes 56. The valve member 58 formed from the rubber sheet is locally fixed at predetermined positions adjacent to the outer circumferential edge thereof to the back surface 42b of the first support member 42. The valve member 58 is shifted between an open position for opening the vent holes 56 and a close position for hermetically closing or sealing the vent holes 56, depending on a difference between the internal pressure of the second gap 54 and the pressure in the outside environment, during the time when the support members 42, 44 securely hold the panel assembly 40.

The producing method (especially, the liquid pouring process) of the panel-type peripheral device 10, using the above-described panel support unit 12, is described below with reference to FIGS. 5 to 6C.

First, the panel assembly 40, securely held between the first and second support members 42, 44 of the panel support unit 12 in the manner as described, is placed together with a top-opening receptacle 60 accommodating the liquid material 34 in a common environment, i.e., a sealed chamber 62. The panel assembly 40 is statically supported, together with the panel support unit 12, by a mounting column 64 installed in the sealed chamber 62, with the passage 32 of the panel assembly being oriented downward. The receptacle 60 is supported in a vertically shiftable manner on a movable carriage 66 provided in the sealed chamber 62, with the liquid material 34 being located beneath the panel support unit 12 and the panel assembly 40. The sealed chamber 62 is also connected independently with a pump unit 68 for evacuating the interior of the sealed chamber 62 and with a cylinder 70 for introducing an inert gas into the sealed chamber 62. A liquid pouring system as shown in FIG. 5 is thus constructed.

Figure 6A:
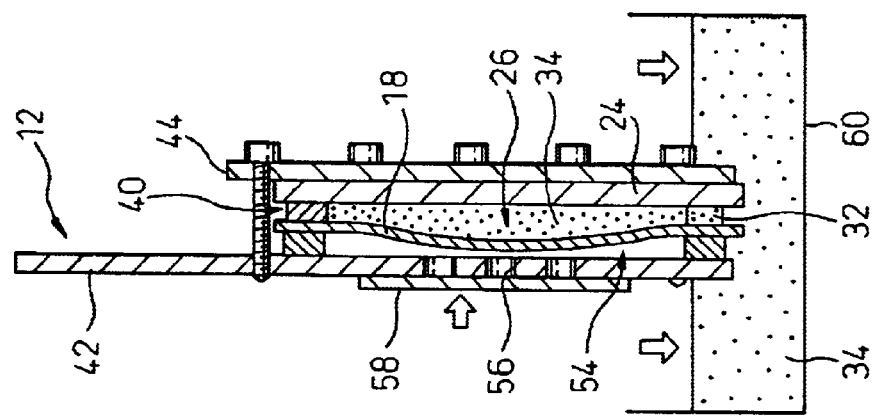
FIGS. 6A to 6C are sectional views showing certain major steps in the producing method of the panel-type peripheral device according to one embodiment of the present invention.

Then, the pump unit 58 is operated in a state where the passage 32 of the panel assembly 40 is exposed to the common environment, i.e., the interior of the sealed chamber 62, so as to evacuate the sealed chamber 62 to depressurize the interior thereof, and thereby the gap 26 between the conductive panel members 18, 24 of the panel assembly 40 is evacuated and the liquid material 34 is vacuum-degassed. At this time, as shown in FIG. 6A, the valve member 58 affixed to the back surface 42b of the first supporting member 42 of the panel support unit 12 is pushed outward by an internal pressure of the second gap 54 defined between the first support member 42 and the first conductive panel member 18 of the panel assembly 40, so as to be elastically deformed to shift into the open position for opening the vent holes 56, which results in the simultaneous evacuation of the second gap 54.

Subsequently, the movable carriage 66 is upwardly moved while keeping the sealed chamber 62 depressurized, so that the bottom end region of the panel support unit 12 as well as the passage 32 of the panel assembly 40 and the area adjacent thereto are immersed into the liquid material 34 in the receptacle 60 to a desired depth. Then, the pump unit 68 is stopped to halt the evacuation procedure. At this time, the liquid material 34 slightly permeates into the gap 26 between the conductive panel members 18, 24 through the passage 32 in the panel assembly 40 due to a capillary action (see FIG. 6B). In this condition, the internal pressure of the second gap 54 between the first support member 42 and the first conductive panel member 18 is balanced against the pressure in the sealed chamber 62, so that the valve member 58 affixed to the first support member 42 is located in a position where the valve member 58 is in contact with the back surface 42b of the first support member 42 so as to substantially close the vent holes 56 due to an elastic restoring force of the valve member 58.

Thereafter, the cylinder 70 is operated to introduce an inert gas into the sealed chamber 62 while keeping the passage 32 of the panel assembly 40 immersed into the liquid material 34, so as to increase a pressure in the sealed chamber 62. Thereby, the gap 26 of the panel assembly 40 is entirely filled with the liquid material 34. At this time, as shown in FIG. 6C, the valve member 58 affixed to the first support member 42 of the panel assembly 40 is pushed against the back surface 42b of the first support member 42 to come into close contact with the back surface 42b, due to a pressure rise in the sealed chamber 62, and is held in a close position for hermetically closing or sealing the vent holes 56. As a result, the second gap 54 is maintained in a vacuum condition. Accordingly, even when the pressure in the sealed chamber 62 is raised, the pressure in the sealed chamber 62 is prevented from being directly applied to the first conductive panel member 18 of the panel assembly 40, whereby it is possible to surely fill the entire region of the gap 26 with the liquid material 34 in the receptacle 60 through the passage 32 of the panel assembly 40, while the deformation of the first conductive panel member 18 in a direction toward the second conductive panel member 24 is eliminated. During this condition, it is predicted that, as shown in the drawings, the first conductive panel member 18 is slightly bent or swelled outward due to the pouring pressure of the liquid material 34. However, it is also expected that, once the panel assembly 40 is pulled apart from the liquid material 34 in the receptacle 60 after being entirely filled with the liquid material 34, the first conductive panel member 18 automatically recovers a substantially flat original shape due to a tension applied thereto while the excess liquid material 34 is forced out from the gap 26.

Finally, the panel support unit 12 and the panel assembly 40 is taken out of the sealed chamber 62, and the passage 32 of the panel assembly 40 is sealed by the sealant 36. In this way, the panel-type peripheral device 10 as shown in FIG. 1 is completed. When the panel support unit 12 is detached from the panel assembly 40, it is advisable to forcibly shift the valve member 58 from the close position to the open position to release the vacuum condition of the second gap 54, which facilitates the detachment of the panel support unit 12.

As described above, in the panel-type peripheral device producing method according to the embodiment of the present invention, even when the panel-type peripheral device 10 can act as a touch panel and the first conductive panel member 18 of the panel assembly 40 has a flexibility for permitting a relatively easy deformation due to a pressure fluctuation in the outside environment, the first conductive panel member 18 is effectively prevented, in the step of filling the gap 26 in the panel assembly 40 with the liquid material 34 by increasing the pressure in the outside environment or sealed chamber 62, from being deformed in a direction toward the second conductive panel member 24 due to the pressure rise, under the function of the panel support unit 12. Therefore, it is possible to rapidly and entirely fill the gap 26 between the conductive panel members 18, 24 of the panel assembly 40 with the liquid material 34, without narrowing the gap 26 in the liquid filling step. Consequently, the panel-type peripheral device 10, as a finished product after being fully filled with the liquid material, is provided with the first conductive panel member 18, acting as the upper detecting element of a touch panel, inherently having a superior flatness over the whole surface thereof, and thus can provide a touch panel ensuring little distortion in a transmitted image as well as an accurate and stable entering operation.

Also, in the panel support unit 12 according to the above-described embodiment of the present invention, the second gap 54 is defined between the first support member 42 and the first conductive panel member 18 of the panel assembly 40, which advantageously results in the possibility, in the liquid filling step as described, of not only preventing the first conductive panel member 18 from being deformed in the direction toward the second conductive panel member 24 but also preventing the second side 14b of the insulating substrate 14, made of a resinous film, of the first conductive panel member 18 from being damaged by the first support member 42.

From the viewpoint of only preventing the first conductive panel member 18 from being deformed toward the second conductive panel member 24 in the liquid filling step, however, the above-described second gap 54 is not necessary. FIG. 7 shows a panel support unit 72, according to the other embodiment of the present invention, in which the second gap 54 is eliminated. The panel support unit 72 has a constitution substantially identical to that of the panel support unit 12 described above, except for the structure of a first support member. Therefore, the corresponding components are designated by common reference numerals and the descriptions thereof are not repeated.

The panel support unit 72 includes a flat plate-shaped first support member 74 having a rigidity or stiffness higher than that of the first conductive panel member 18 of the panel assembly 40 as described above or, preferably, a rigidity for enabling the support member 74 to maintain the original shape thereof against a pressure fluctuation in the outside environment, and a second support member 44 cooperating with the first support member 74 to securely or fixedly hold the panel assembly 40 therebetween. The first support member 74 includes a flat support surface 74a sufficiently larger than the second side 14b of the insulating substrate 14 of the first conductive panel member 18.

The first and second support members 74, 44 hold the panel assembly 40 therebetween, and are fixed in this state with each other by a plurality of bolts 46 dispersedly arranged around the panel assembly 40. The first and second support members 74, 44 are provided at corresponding locations with plural internal thread holes 76 and plural through holes 50, respectively, and each bolt 46 is inserted through each through hole 50 and screwed into the corresponding internal thread hole 76. A rectangular flat plate-shaped spacer 78 is securely provided on the support surface 74a of the first support member 74 and inside the plural internal thread holes 76 disposed in a rectangular array. The spacer 78 is preferably formed from a rubber sheet, and is shaped and dimensioned in such a manner as to be capable of closely contacting with the second side 14b of the insulating substrate 14 of the first conductive panel member 18 of the panel assembly 40. One straight edge 78a of the spacer 78 is placed along one edge (a bottom edge in the drawing) of the support surface 42a of the first support member 42.

The panel assembly 40 is securely held between the support members 74, 44 of the panel support unit 72 in a state where the second side 14b of the insulating substrate 14 of the first conductive panel member 18 oppositely faces the support surface 74a of the first support member 74 and hermetically contacts with the spacer 78 over the entire area of the latter, and the second side 20b of the insulating substrate 20 of the second conductive panel member 24 abuts the support surface 44a of the second support member 44. At this time, the panel assembly 40 is positioned or oriented so that the passage 32 communicating to the gap 26 between the conductive panel members 18, 24 is exposed to the outside of the panel support unit 72 from the straight edge 78a of the spacer 78. During the time when the panel support unit 72 is mounted to the panel assembly 40 in this manner, the first conductive panel member 18 is maintained in a flat shape, by the first support member 74 of the panel support unit 72, in a condition where it is not affected directly from the pressure fluctuation of the outside environment.

In the panel support unit 72 according to the above-described embodiment, it is also possible, in the above-described liquid filling step of the panel-type peripheral device producing method, to surely prevent the first conductive panel member 18 from being deformed in the direction toward the second conductive panel member 24. Moreover, in the case where the spacer 78 is formed from a rubber sheet, it is possible to prevent the second side 14b of the insulating substrate 14, made of a resinous film, of the first conductive panel member 18, being damaged.

The panel support unit according to the present invention may have various configurations other than the above-described embodiments. For example, the second support member cooperating with the first support member may have not only the flat plate shape as described above but also the other various shapes, such as a bar or a frame, provided that the second support member is capable of fixedly supporting the panel assembly. It is also possible to insert a spacer, such as a rubber sheet, between the second support member and the second conductive panel member of the panel assembly. Particularly, in the case where the objective panel-type peripheral device includes the first and second conductive panel members of the panel assembly, both having a flexibility for permitting a relatively easy deformation due to the pressure fluctuation in the outside environment, it is preferred that the second support member has a configuration similar to the first support member in each of the above embodiments.

In the producing method of the panel-type peripheral device 10 according to the above-described embodiments, the liquid material 34 and the panel assembly 40 are placed in a depressurized environment in the sealed chamber 62, in the step of pouring the liquid material 34 into the gap 26 between the conductive panel members 18, 24 of the panel assembly 40, so that it is a precondition that the liquid material 34 having a sufficiently low vapor pressure, such as a silicone oil, is used. Contrary to this, a producing method according to the other embodiment is capable of producing the panel-type peripheral device 10, by selecting various liquid materials without being restricted in the vapor pressure. The producing method is described below with reference to FIGS. 8 to 11.

Figure 5:
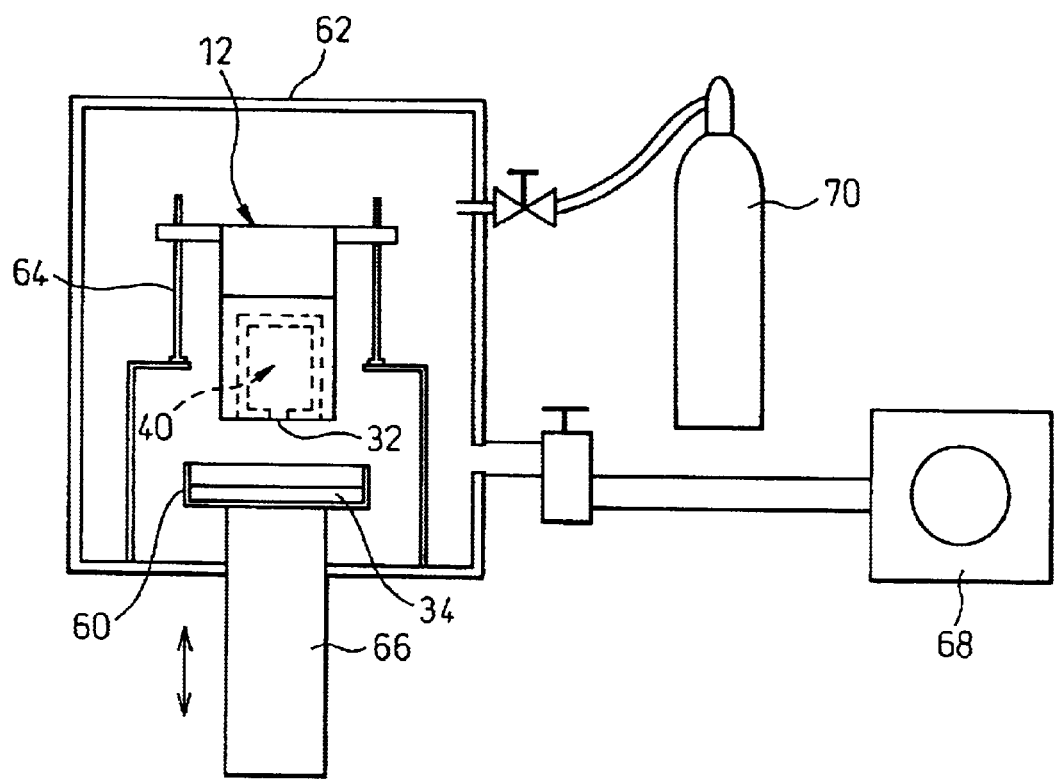
FIG. 5 is a schematic illustration showing an entire arrangement of a liquid pouring system for performing the producing method of the panel-type peripheral device according to one embodiment of the present invention.
Figure 6B:
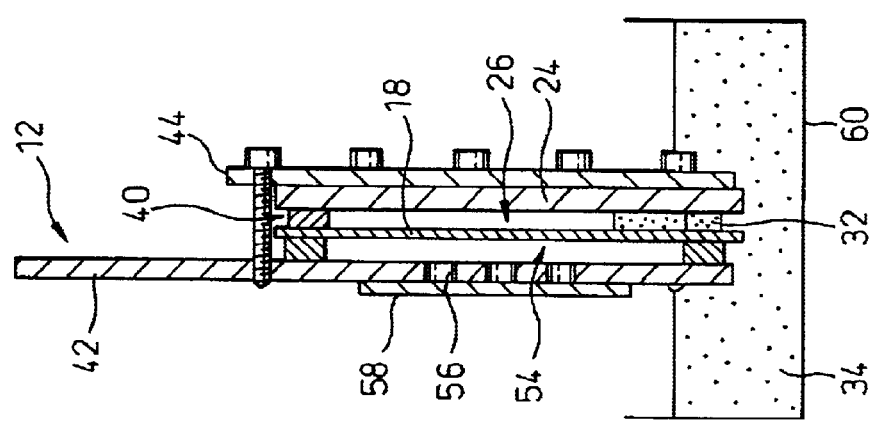
Figure 6C:
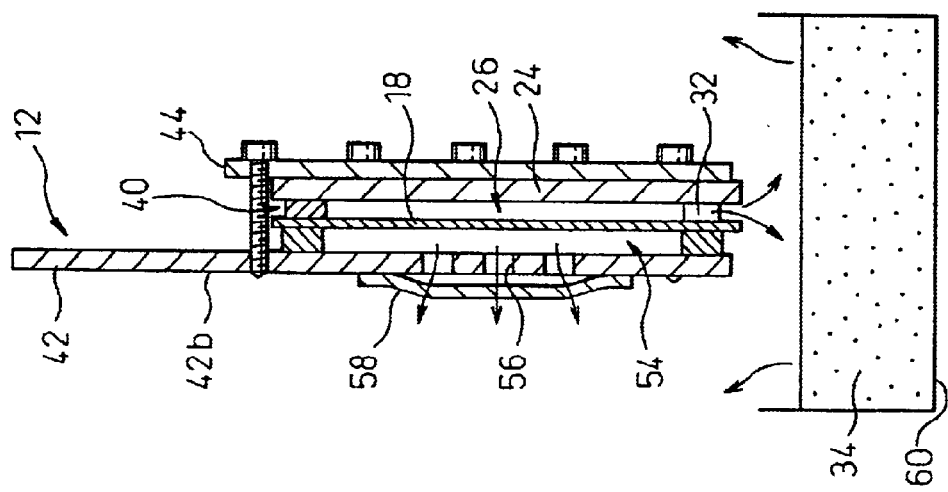

In this producing method, a liquid pouring system 80 having a configuration different from the liquid pouring system shown in FIG. 5 is used in a liquid pouring process of the panel-type peripheral device 10. The liquid pouring system 80 has a configuration for securely or fixedly supporting the panel assembly 40 (FIG. 2), as the unfilled structure of the panel-type peripheral device 10, in a predetermined posture. It should be appreciated that the panel-type peripheral device 10 produced through this producing method is provided with a structure essentially identical to one shown in FIG. 1 except for the properties of the liquid material. In particular, it is a precondition that at least one of conductive panel members 18, 24 has a flexibility for permitting a relatively easy deformation due to a pressure fluctuation of an outside environment.

Figure 8:
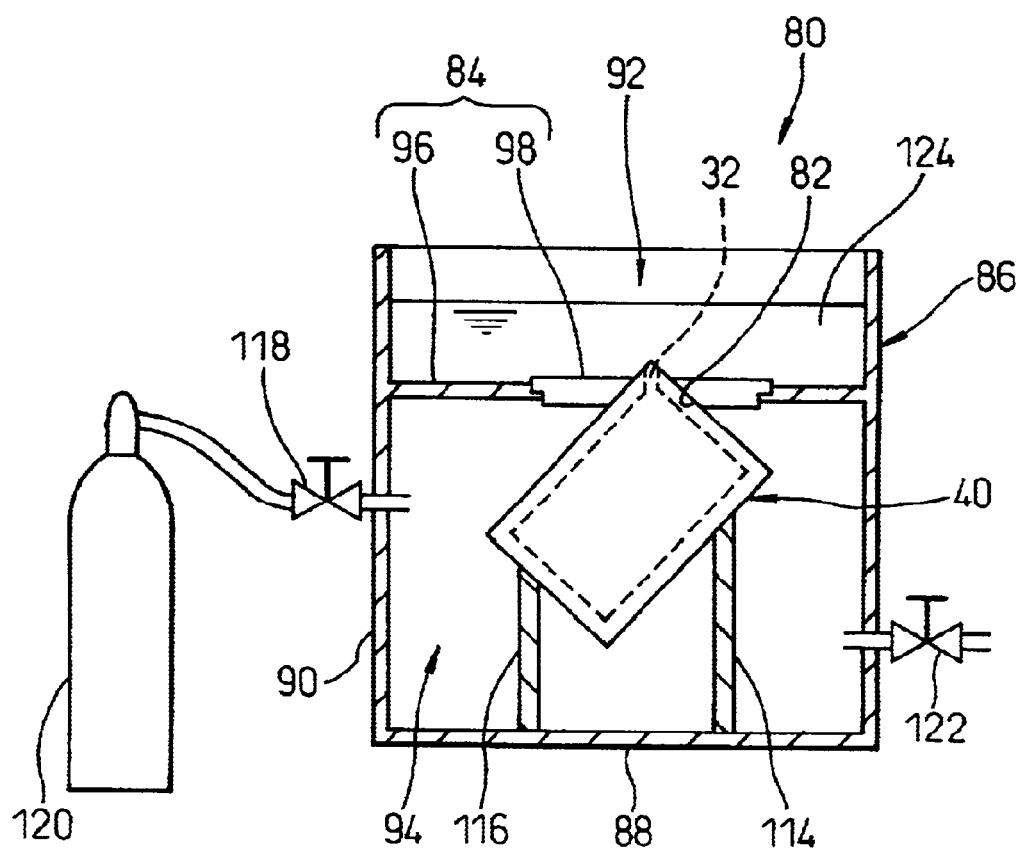
FIG. 8 is a schematic illustration showing an entire arrangement of a liquid pouring system used for performing a producing method of a panel-type peripheral device according to another embodiment of the present invention.
Figure 9:
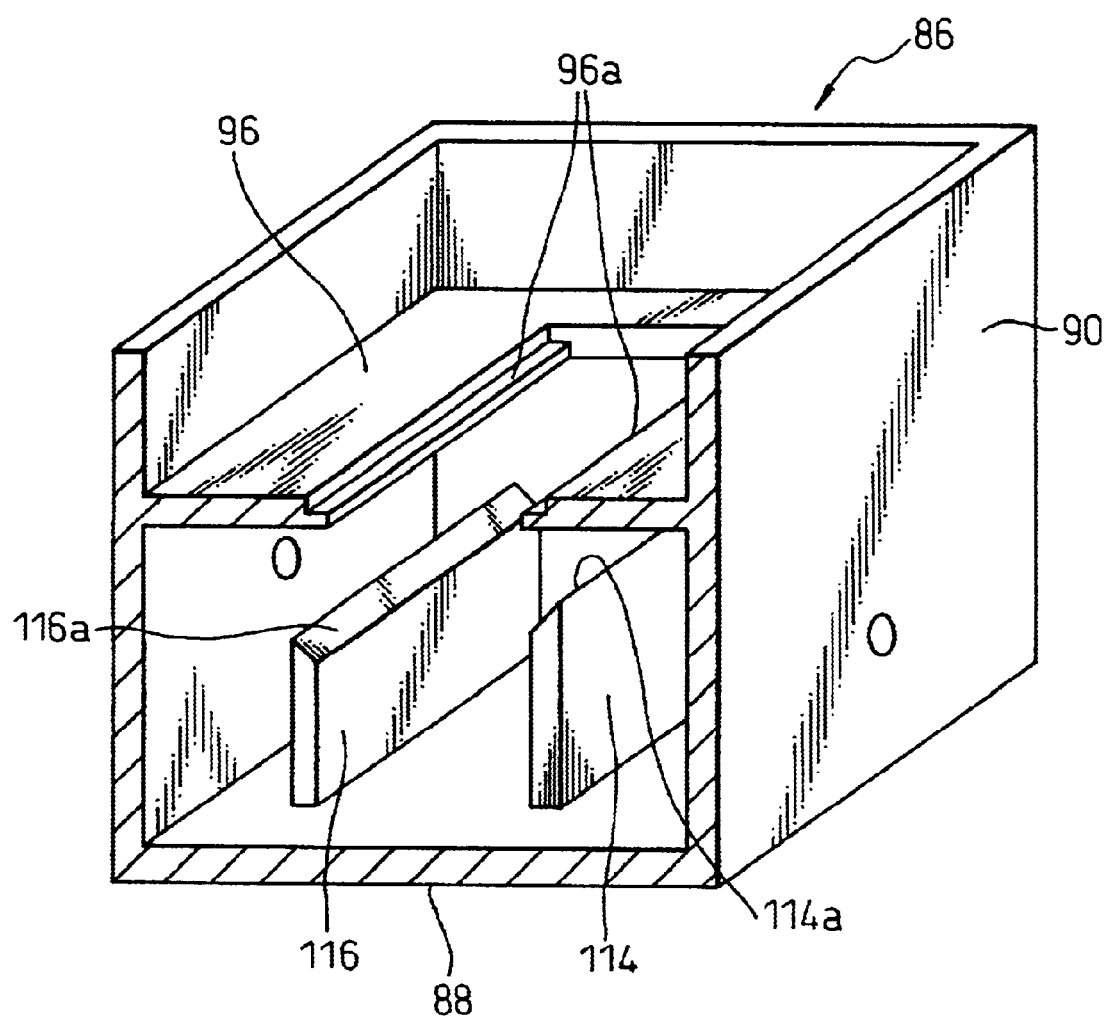
FIG. 9 is a cut-out perspective view showing a major portion of a box-shaped support unit in the liquid pouring system of FIG. 8.
Figure 10:
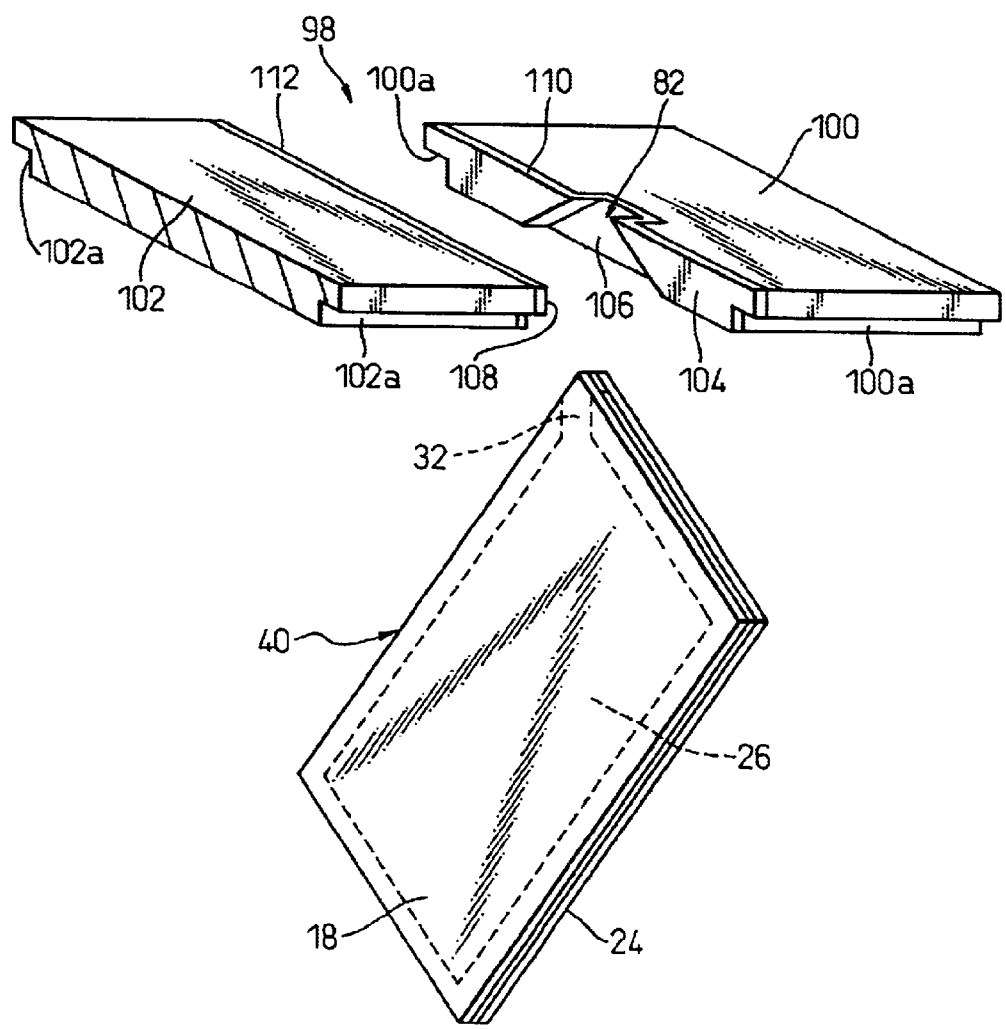
FIG. 10 is an exploded perspective view showing a sealing member in the liquid pouring system of FIG. 8, together with the panel assembly.

As shown in FIG. 8, the liquid pouring system 80 includes a box-shaped support unit 86 provided with a partition wall 84 having a through opening 82, into which a part of the panel assembly 40 is fitted in a hermetically sealed manner. The box-shaped support unit 86 is further provided with a generally rectangular bottom wall 88 arranged generally parallel to the partition wall 84 and spaced from the latter, and a rectangular-tube side wall 90 extending orthogonal to both the partition and bottom walls 84, 88, to surround them, and integrally connected to the partition and bottom walls 84, 88. A top-opening type, liquid-material storing vessel 92 is formed, on one side (the upper side in the drawing) of the partition wall 84, by the partition wall 84 and a part of the side wall 90. A closed type, pressure regulating chamber 94 is formed, on the other side (the lower side in the drawing) of the partition wall 84, by the partition wall 84 and the residual part of the side wall 90.

The partition wall 84 is constituted by a frame wall part 96 extending in a frame-shape along the inner surface of the side wall 90 to be integrally joined to the side wall 90, and a sealing member 98 detachably attached to the inner periphery of the frame wall part 96 to define the through opening 82 therein. In the illustrated embodiment, the sealing member 98 is structured from first and second sealing plate 100, 102 (see FIG. 10) respectively having stepped outer edges 100*a*, 102*a* adapted to be fitted to opposed stepped inner edges 96*a* (see FIG. 9) of the frame wall part 96. The first sealing plate 100 is provided, along one lateral edge perpendicular to the outer edge 100*a*, with a flat sealing face 104 and a recess 106 formed at a generally center of the sealing face 104, the recess 106 being capable of receiving one corner region of the panel assembly 40. The second sealing plate 102 is provided, along one lateral edge perpendicular to the outer edge 102*a*, with a flat sealing face 108. The first and second sealing plates 100, 102 are assembled together with the sealing faces 104, 108 thereof in close contact with each other, and in this state, the through opening 82 is defined between the sealing faces 104, 108.

In the illustrated embodiment, the panel assembly 40 is constituted in such a manner that the passage 32 communicating to the gap 26 between the conductive panel members 18, 24 is located in one corner region of the panel assembly. The panel assembly 40 is mounted to the box-shaped support unit 86 while the corner region including the passage 32 is fitted in a hermetically sealed manner into the through opening 82 of the mutually assembled first and second sealing plates 100, 102. In this state, the panel assembly 40 is oriented in such a manner that the passage 32 thereof opens to the liquid-material storing vessel 92 and the major parts of the conductive panel members 18, 24 are located in the pressure regulating chamber 94. It is preferred that rubber packings 110, 112 are respectively provided on the sealing faces 104, 108 and the recess 106 of the first and second sealing plates 100, 102, to improve the hermetic sealing between the panel assembly 40 and the through opening 82 of the partition wall 84.

The pressure regulating chamber 94 of the box-shaped support unit 86 is provided with a pair of support walls 114, 116 spaced parallel to each other and arranged orthogonal to the bottom wall 88, the support walls serving as a support mechanism for securely supporting the panel assembly 40 at a required position in a liquid pouring process. The support walls 114, 116 extend from the bottom wall 88 to mutually different heights, and slanted support faces 114*a*, 116*a* are respectively formed on the tops of the support walls, positioned at mutually different distances from the bottom wall 88. The support walls 114, 116 are abutted at the slanted support faces 114*a*, 116*a* thereof to the outer circumferential edge of the panel assembly 40, so as to securely or fixedly support the panel assembly 40 in such a posture required in the liquid pouring process that the corner region including the passage 32 is fitted into the through opening 82 of the partition wall 84 in a hermetically sealed manner.

It will be appreciated that any of various means, in place of the support walls 114, 116, may be adopted as the above-described support mechanism, such as wires stretched at positions corresponding to the slanted support faces 114*a*, 116*a* of the support walls 114, 116. Also, in the case where the panel assembly 40 is capable of being securely supported in the posture required in the liquid pouring process only by the press fitting action of the rubber packings 110, 112 optionally provided in the first and second sealing plates 100, 102, the support walls 114, 116 may be omitted.

The liquid pouring system 80 is further provided with a cylinder 120 connected through a pressure reducing valve 118 to the pressure regulating chamber 94 of the box-shaped support unit 86, and a throttle valve 122 connected to the pressure regulating chamber 94 independently of the pressure reducing valve 118. The throttle valve 122 is capable of selectively releasing the internal pressure of the pressure regulating chamber 94 to the ambient atmospheric pressure of the liquid pouring system 80. Therefore, in the liquid pouring system 80, it is possible to introduce the inert gas from the cylinder 120 to the pressure regulating chamber 94 to increase the internal pressure of the pressure regulating chamber 94 to a desired level, by suitably operating the pressure reducing valve 118 during the closed state of the throttle valve 122. Also, it is possible to reduce the internal pressure of the pressure regulating chamber 94 to the ambient atmospheric pressure by opening the throttle valve 122 after the internal pressure of the pressure regulating chamber 94 is increased to the desired level.

Figure 11:
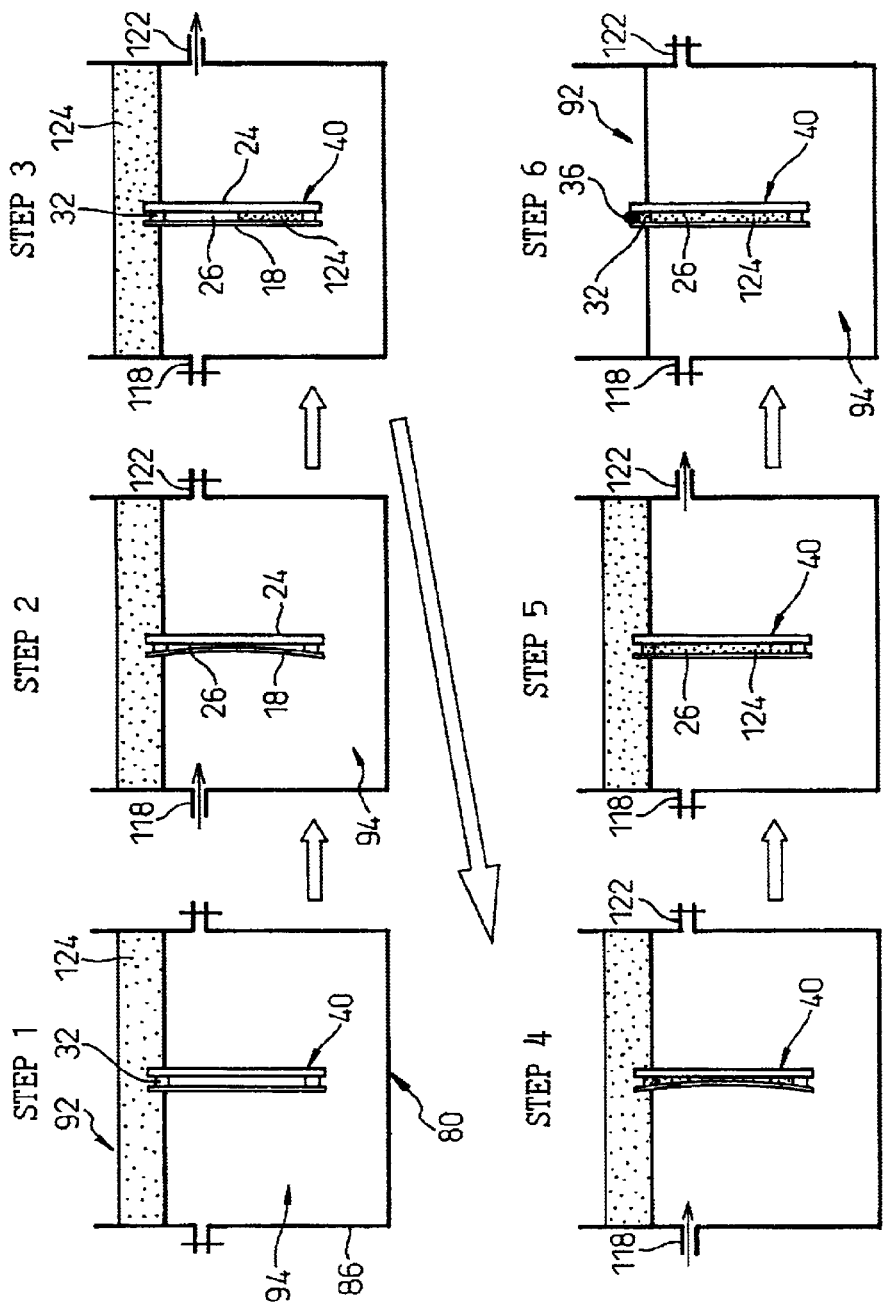
FIG. 11 is a schematic illustration showing certain major steps in the producing method of the panel-type peripheral device according to another embodiment of the present invention.

The producing method (especially, the liquid pouring process) of the panel-type peripheral device 10, using the above-described liquid pouring system 80, is described below with reference to FIG. 11.

First, the panel assembly 40 is mounted onto the box-shaped support unit 86 in the required posture for the liquid pouring process, and the pressure regulating chamber 94 (i.e., an environment on another side of the partition wall 84) is maintained at the ambient atmospheric pressure of the liquid pouring system. Then, a desired type of liquid material 124 is supplied into the liquid-material storing vessel 92 (i.e., one side of the partition wall 84) to a level sufficiently higher than the passage 32 of the panel assembly 40 opening into the liquid-material storing vessel 92 (Step 1).

Then, during the closed state of the throttle valve 122, the pressure reducing valve 118 is operated to introduce the inert gas from the cylinder 120 (FIG. 8) to the pressure regulating chamber 94, so as to increase the internal pressure of the pressure regulating chamber 94 to a desired level. Thereby, the first conductive panel member 18 of the panel assembly 40 is deformed in a direction toward the second conductive panel member 24, so that the gap 26 between the conductive panel members 18, 24 is at least partially evacuated (Step 2). At this time, the flexible first conductive panel member 18 is preferably held under a given tension by the second conductive panel member 24, so that the first conductive panel member is elastically deformed while generating an internal stress.

Next, the pressure reducing valve 118 is closed and the throttle valve 122 is opened, so as to reduce the internal pressure of the pressure regulating chamber 94 to the ambient atmospheric pressure. Thereby, the first conductive panel member 18 of the panel assembly 40 is elastically restored to an initial position away from the second conductive panel member 24. Simultaneously, a volume of the liquid material 124 corresponding to an evacuated gas volume is filled into the gap 26 between the conductive panel members 18, 24 through the passage 32 of the panel assembly 40 (Step 3). Subsequently, the increasing step and the reducing step of the internal pressure of the pressure regulating chamber 94 are repeated in a desired frequency with suitable intervals (Steps 4 and 5). Consequently, the gap 26 of the panel assembly 40 is fully evacuated, and thus the sufficient volume of liquid material 124 is filled into the gap 26.

Thereafter, the residual liquid material 124 is discharged from the liquid-material storing vessel 92 through a drain (not shown), and the passage 32 of the panel assembly 40 is sealed or closed by the sealant 36 (Step 6). In this way, the panel-type peripheral device 10 shown in FIG. 1 is completed. In this respect, it is possible to seal the passage 32 while the liquid material 124 filled into the gap 26 in the panel assembly 40 is kept in an optimum volume, i.e., while no air is carelessly introduced into the gap 26, by, e.g., closing both the pressure reducing valve 118 and the throttle valve 122 to maintain the internal pressure of the pressure regulating chamber 94 at a suitable level before the passage 32 is sealed.

In the above-described liquid pouring process, the step 1 and the step 2 are interchangeable with each other. That is, after the panel assembly 40 is mounted onto the box-shaped support unit 86 in the posture required to the liquid pouring process, the pressure reducing valve 118 is first operated, during the closed state of the throttle valve 122, so as to increase the internal pressure of the pressure regulating chamber 94 to a desired level, and thereby, the gap 26 between the conductive panel members 18, 24 of the panel assembly 40 is at least partially evacuated. Then, while this condition is maintained, the liquid material 124 is supplied into the liquid-material storing vessel 92 to a sufficient level. Thereafter, in the step 3, the pressure reducing valve 118 is closed and the throttle valve 122 is opened, whereby it is possible to fill the gap 26 between the conductive panel members 18, 24 with a volume of the liquid material 124 corresponding to an evacuated gas volume.

As described above, in the panel-type peripheral device producing method using the liquid pouring system 80, according to the above embodiment of the present invention, even when the first conductive panel member 18 of the panel-type peripheral device 10 to be produced has a flexibility for permitting a relatively easy deformation due to a pressure fluctuation in the outside environment, the pressure in the outside environment or box-shaped sport unit 86 is not increased in the step of filling the gap 26 in the panel assembly 40 with the liquid material 124, so that the first conductive panel member 18 is surely prevented from being deformed in a direction toward the second conductive panel member 24 during the liquid filling process. Therefore, it is possible to surely and entirely fill the gap 26 between the conductive panel members 18, 24 of the panel assembly 40 with the liquid material 124, without narrowing the gap 26 in the liquid filling step. Consequently, the panel-type peripheral device 10, as a finished product after being fully filled with the liquid material, is provided with the first conductive panel member 18, acting as the upper detecting element of a touch panel, inherently having a superior flatness over the whole surface thereof, and thus can provide a touch panel ensuring little distortion in a transmitted image as well as an accurate and stable entering operation.

In this particular embodiment, the liquid material 124 is not placed under a depressurized environment in the liquid pouring process, so that it is possible to select the liquid material 124 from various liquid materials having a refractive index equivalent to that of each conductive panel member 18, 24 without being restricted by a vapor pressure. Accordingly, the range of selection of the liquid material 124 is widened, and thereby it is possible to facilitate the structural optimization of the panel-type peripheral device 10 by, e.g., a selection of the liquid material 124 having a chemical stability in relation to the materials of various components of the panel assembly 40. In this respect, because the liquid material 124 is not vacuum-degassed in the above liquid pouring process, it is advantage to mix a surface-active agent in the liquid material 124 to prevent a bubble generation in the liquid material.

Also, in the above embodiment, the panel-type peripheral device 10 is provided at one corner region thereof with the passage 32 communicating to the gap 26 between the conductive panel members 18, 24, and the corresponding corner region of the panel assembly 40 is fitted into the through opening 82 of the partition wall 84 in a hermetically sealed manner, so that it is possible to reduce the size or dimension of the through opening 82 as much as possible to improve the gas-tightness of the latter. However, the above-described liquid pouring process may be performed for the panel assembly 40 as shown in FIG. 2, having the passage 32 located at a desired position in one straight edge of the panel assembly.

The liquid pouring system 80 for use in the above-described liquid pouring process may have various other configurations. For example, the liquid-material storing vessel 92 of the box-shaped support unit 86 may be structured so as to be closable in a sealed manner and to be able to selectively change the internal pressure thereof. In this configuration, it is possible, in the step of filling the gap 26 in the panel assembly 40 with the liquid material 124, to improve the rate of filling the gap 26 with the liquid material 124, by increasing the internal pressure of the liquid-material storing vessel 92 to a desired level simultaneously with the reduction of the internal pressure of the pressure regulating chamber 94 to the ambient atmospheric pressure. Also, in this configuration, the positional correlation between the liquid-material storing vessel 92 and the pressure regulating chamber 94 may be modified from the illustrated vertical arrangement to a laterally side-by-side arrangement.

Figure 12:
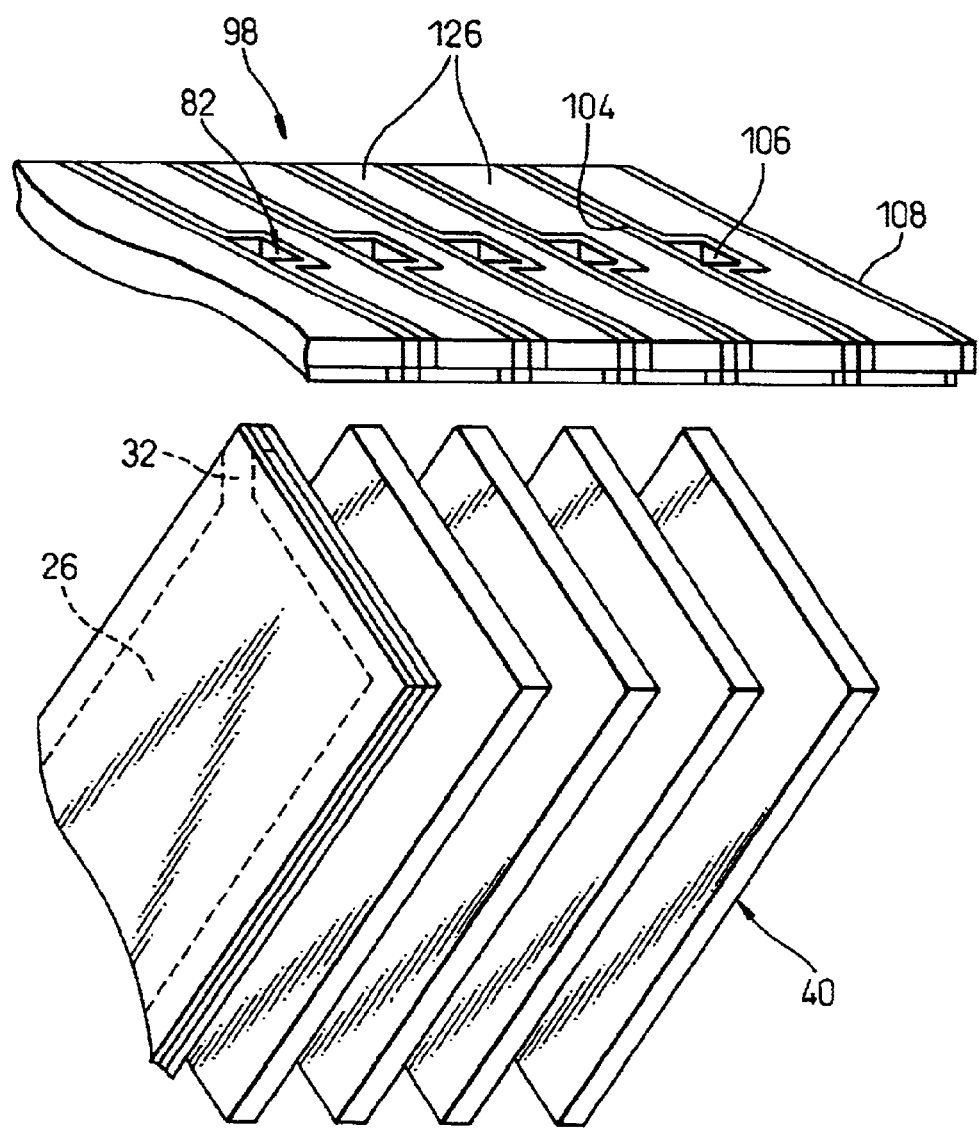
FIG. 12 is an exploded perspective view showing a modified sealing member together with the panel assembly.
Figure 13:
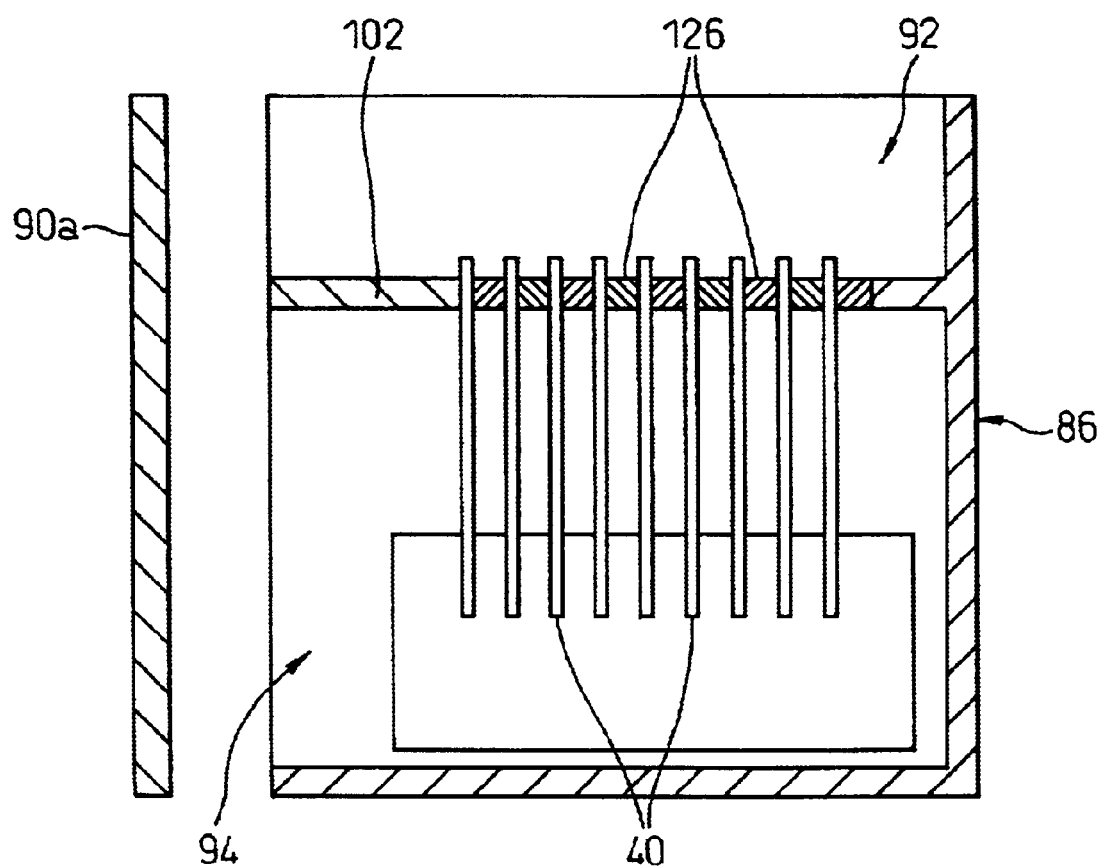
FIG. 13 is a schematic sectional view showing a modified box-shaped support unit together with the panel assembly.

As shown in FIGS. 12 and 13, the partition wall 84 of the box-shaped support unit 86 may be provided with a plurality of through openings 82, each of which allows a part of each of plural panel assemblies 40 to be fitted thereto in a hermetically sealed manner. In this configuration, a plurality of short-type third sealing plates 126 may be used, each of which is provided along one lateral edge with a sealing face 104 and a recess 106, similar to the first sealing plate 100 as described, and along the opposite lateral edge with a sealing face 108, similar to the second sealing plate 102 as described. The sealing member 98 may be formed from the third sealing plates 126 assembled in a regular side-by-side arrangement. In this arrangement, the adjacent third sealing plates 126 are assembled together with the sealing faces 104, 108 thereof in close contact with each other, so that the through opening 82 is defined between the recess 106 and the sealing face 108.

When the box-shaped support unit 86 having the above configuration is used, it is possible to mount a plurality of panel assemblies 40, the number of which corresponds to the number of the through openings 82, to the box-shaped support unit 86 and to subject them to the liquid pouring process in the same manner as described, so as to simultaneously fill the gaps 26 of the respective panel assemblies 40 with the liquid material 124. In this configuration, the second sealing plate 102 may be suitably assembled in the sealing member 98 at a portion requiring no through opening 82, as shown in FIG. 13. Also, the box-shaped support unit may be structured so that a desired wall part thereof (one side-wall part 90a in the example of FIG. 13) is detachable, so as to facilitate the mounting procedure of the plural panel assemblies 40.

Incidentally, in the case where a liquid material having a sufficiently low vapor pressure, such as a silicone oil, is used, the panel-type peripheral device 10 may also be produced by using another liquid pouring system similar to the liquid pouring system 80 shown in FIG. 8, through a procedure different from the above-described producing method. Such a producing method according to a further embodiment of the present invention will be described below, with reference to FIGS. 14 to 16.

Figure 14:
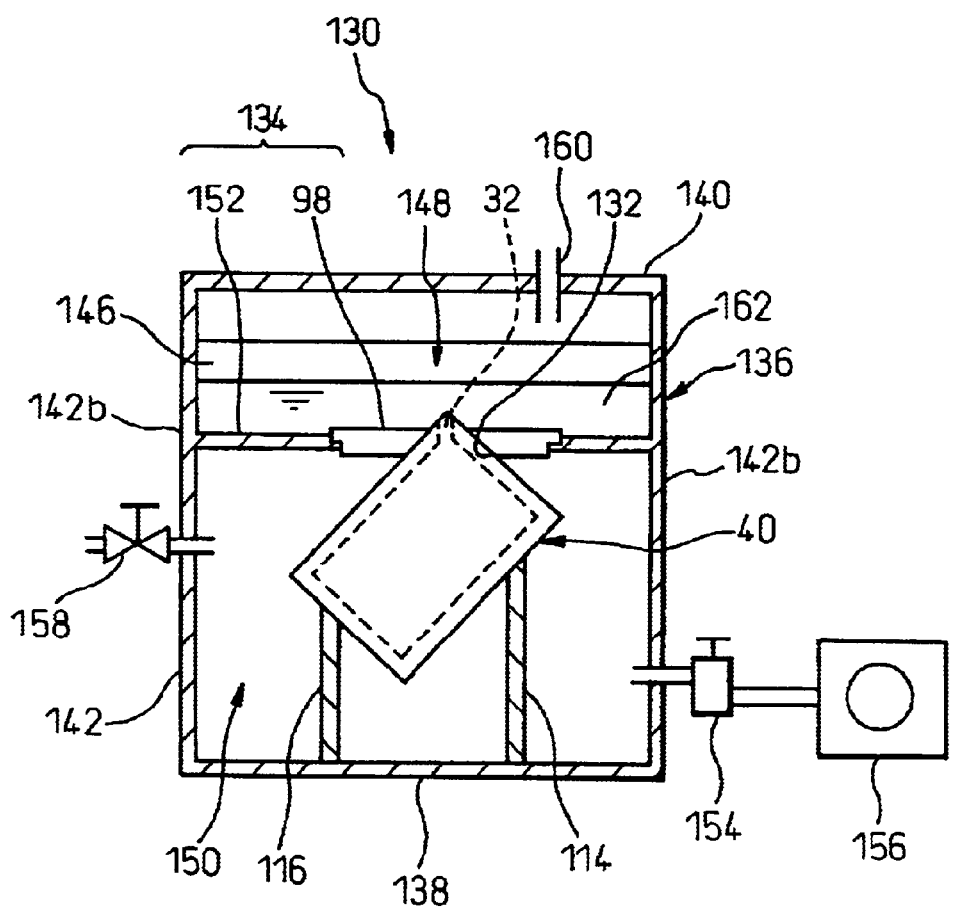
FIG. 14 is a schematic illustration showing an entire arrangement of a liquid pouring system used for performing a producing method of a panel-type peripheral device according to a further embodiment of the present invention.
Figure 15:
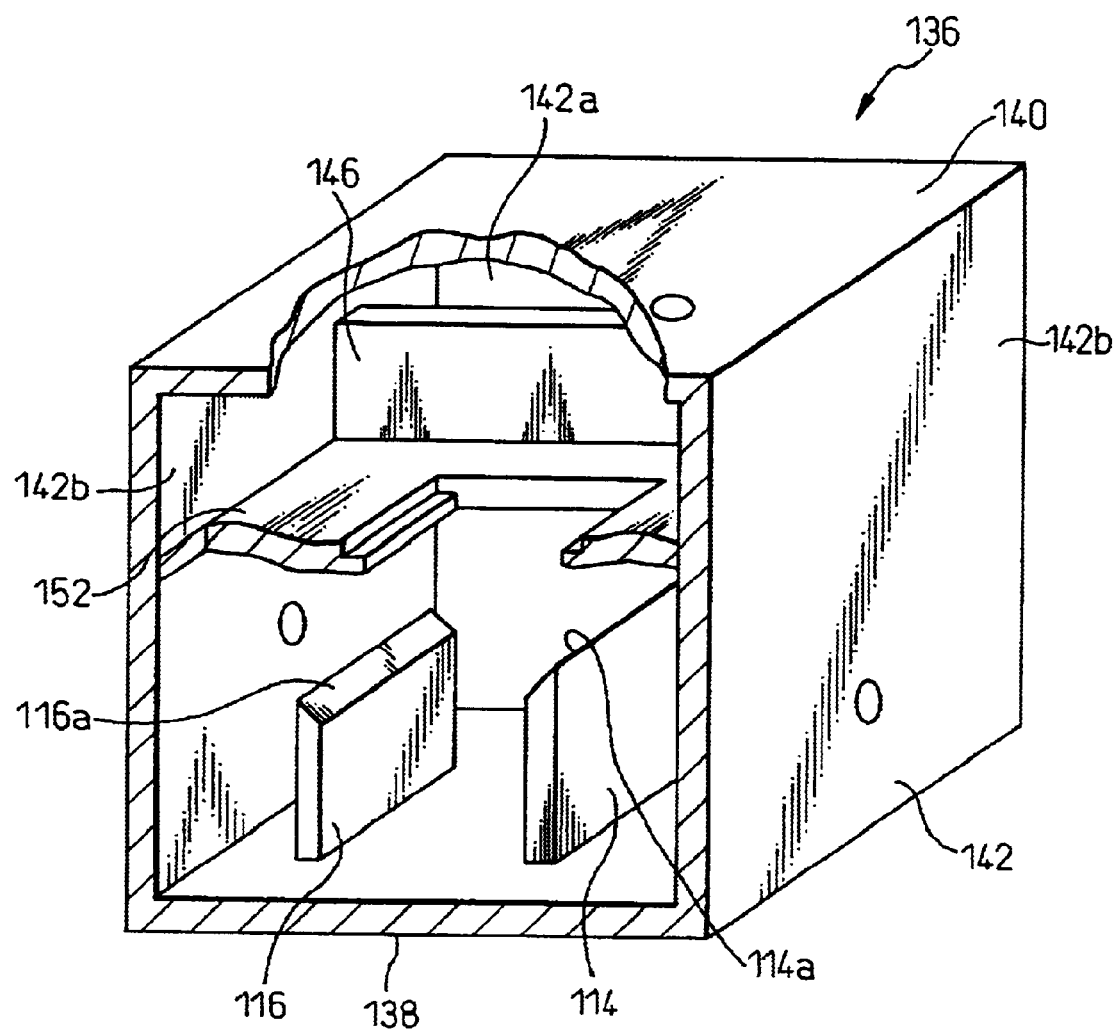
FIG. 15 is a cut-out perspective view showing a major portion of a box-shaped support unit in the liquid pouring system of FIG. 14.

The liquid pouring system 130 used in this producing method has a configuration for securely or fixedly supporting the panel assembly 40 (FIG. 2), as the unfilled structure of the panel-type peripheral device 10, in a predetermined posture, in a way similar to the liquid pouring system 80. As shown in FIG. 14, the liquid pouring system 130 includes a box-shaped support unit 136 provided with a center wall 134 having a through opening 132, into which a part of the panel assembly 40 is fitted. The box-shaped support unit 136 is further provided with a generally rectangular bottom wall 138 arranged generally parallel to the center wall 134 and spaced from the latter, a generally rectangular top wall 140 arranged generally parallel to the center wall 134 and spaced from the latter in the opposite side to the bottom wall 138, and a rectangular-tube side wall 142 extending orthogonal to all of the center, bottom and top walls 134, 138, 140 to surround them and integrally connected to the center, bottom and top walls 134, 138, 140. One side (the upper side in the drawing) and the other side (the lower side in the drawing) of the wall 134 are communicated with each other in a fluid flowable manner, through a pair of openings 144 (see FIG. 16) defined between the center wall 134 and a pair of opposed side-wall parts 142a.

The center wall 134 is provided, at the outer edges thereof defining the openings 144, with a pair of edge walls 146 formed integrally with the center wall 134 and extending toward the top wall 140. Each edge wall 146 is also integrally joined to another pair of opposed side-wall parts 142b adjacent to the side-wall parts 142a. Consequently, a top-opening type, liquid-material storing vessel 148 is formed on one side (the upper side in the drawing) of the center wall 134, with a bottom thereof being formed by the center wall 134. A closed type, pressure regulating chamber 150 is continuously formed around the liquid-material storing vessel 148 including the center wall 134.

The center wall 134 is constituted by a frame wall part 152 extending in a frame-shape along the inner surface of the side-wall parts 142b and the edge walls 146, and a sealing member 98 detachably attached to the inner periphery of the frame wall part 152 to define the through opening 132 therein. The sealing member 98 may have a constitution substantially identical to the sealing member 98 installed in the box-shaped support unit 86 of the liquid pouring system 80 shown in FIG. 8, and thus a description thereof is not repeated.

The panel assembly 40 is mounted to the box-shaped support unit 136 while the corner region including the passage 32 is fitted, preferably in a liquid tight manner, into the through opening 132 of the sealing member 98. During this state, the panel assembly 40 is oriented in such a manner that the passage 32 thereof opens to the liquid-material storing vessel 148, and is subjected to the liquid pouring process in this posture. In this embodiment, the hermetic sealing between the panel assembly 40 and the through opening 132 of the wall 134 is not required, so that the rubber packings 110, 112 shown in FIG. 10 may be omitted.

The pressure regulating chamber 150 of the box-shaped support unit 136 is provided with a pair of support walls 114, 116 spaced parallel to each other and arranged orthogonal to the bottom wall 138, the support walls serving as a support mechanism for securely supporting the panel assembly 40 at a required position in a liquid pouring process. The support walls 114, 116 may have a constitution substantially identical to the support walls 114, 116 installed in the box-shaped support unit 86 of the liquid pouring system 80 shown in FIG. 8, and thus a description thereof is not repeated.

The liquid pouring system 130 is further provided with a pump unit 156 connected through a relief valve 154 to the pressure regulating chamber 150 of the box-shaped support unit 136, and a throttle valve 158 connected to the pressure regulating chamber 150 independently of the relief valve 154. The relief valve 154 acts to evacuate the interior of the pressure regulating chamber 150. The throttle valve 158 is capable of selectively releasing the internal pressure of the pressure regulating chamber 150 to the ambient atmospheric pressure of the liquid pouring system 130. The box-shaped support unit 136 is further provided with a liquid-material supply port 160 formed in the top wall 140 at a position above the liquid-material storing vessel 148.

Figure 16:
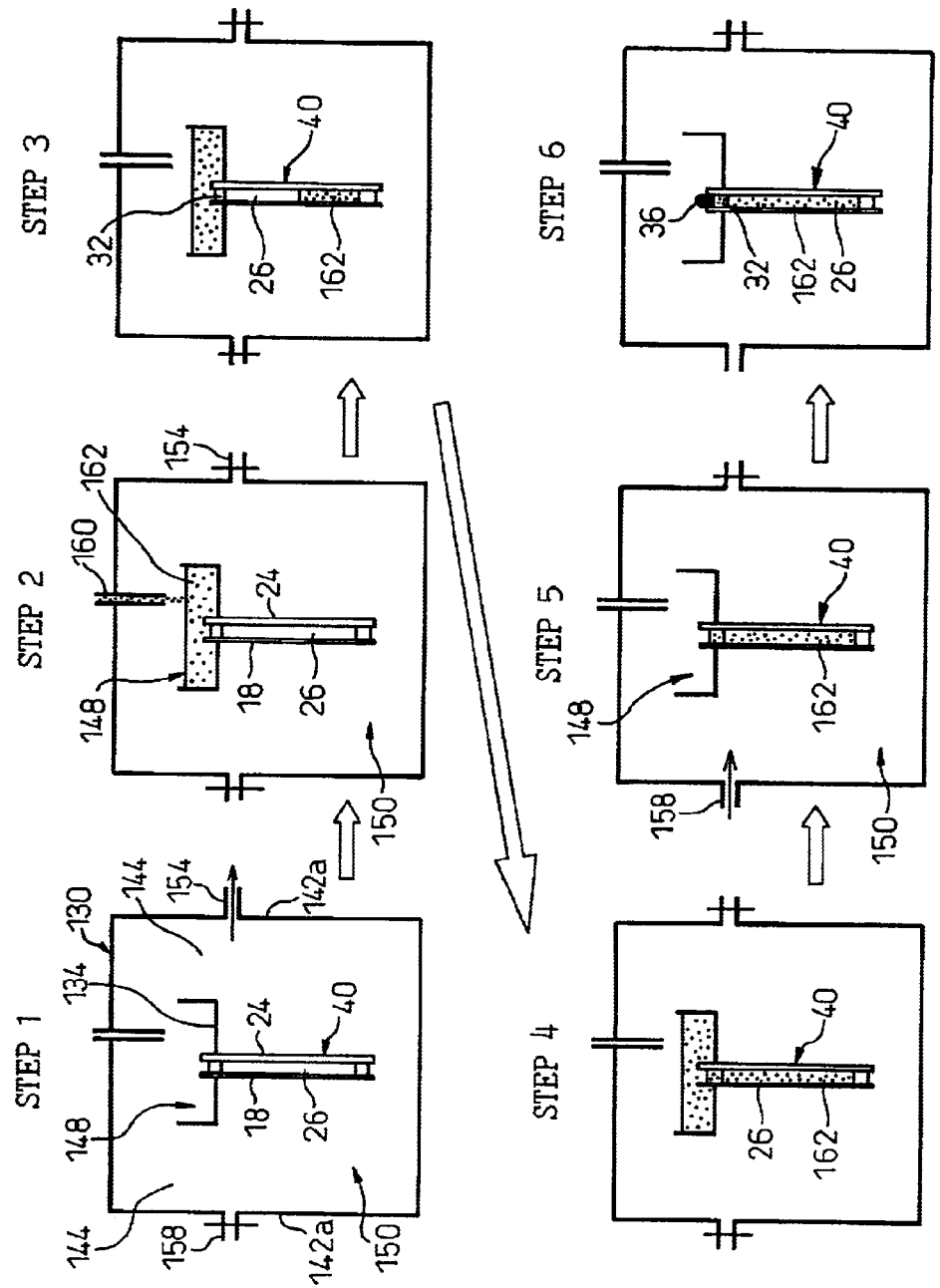
FIG. 16 is a schematic illustration showing certain major steps in the producing method of the panel-type peripheral device according to the further embodiment of the present invention.

The producing method (especially, the liquid pouring process) of the panel-type peripheral device 10, using the above-described liquid pouring system 130, is described below with reference to FIG. 16.

First, the panel assembly 40 is mounted onto the box-shaped support unit 136 in the posture required to the liquid pouring process, in a manner as described above. During this state, the throttle valve 158 is closed and the relief valve 154 is opened, while the pump unit 156 is actuated to evacuate the pressure regulating chamber 150 (i.e., an environment in both sides of the wall 134) (Step 1). In this respect, although the gap 26 between the conductive panel members 18, 24 of the panel assembly 40 is simultaneously evacuated, the outside environment of the panel assembly 40, i.e., the pressure regulating chamber 150, is entirely evacuated to a level identical to the gap 26, and thereby the flexible first conductive panel member 18 is prevented from being deformed in a direction toward the rigid second conductive panel member 24.

Next, the relief valve 154 is closed and the pressure regulating chamber 150 is maintained in a vacuum condition, while a liquid material 162 is supplied into the liquid-material storing vessel 148 (i.e., one side of the wall 134) through the liquid-material supply port 160 to a level sufficiently higher than the passage 32 of the panel assembly 40 opening into the liquid-material storing vessel 148 (Step 2). Then, this state is maintained over a predetermined time, so that the gap 26 in the panel assembly 40 is filled with the liquid material 162 flowing through the passage 32 due to gravity (Steps 3 and 4).

Thereafter, during the closed state of the relief valve 154, the throttle valve 158 is opened to release the internal pressure of the pressure regulating chamber 150 to the ambient atmospheric pressure. Then, the residual liquid material 162 is discharged from the liquid-material storing vessel 148 through a drain (not shown) (Step 5), and the passage 32 of the panel assembly 40 is sealed or closed by the sealant 36 (Step 6). In this way, the panel-type peripheral device 10 shown in FIG. 1 is completed.

As described above, in the panel-type peripheral device producing method using the liquid pouring system 130, according to the above embodiment of the present invention, even when the first conductive panel member 18 of the panel-type peripheral device 10 to be produced has a flexibility for permitting a relatively easy deformation due to a pressure fluctuation in the outside environment, the pressure in the outside environment or box-shaped sport unit 136 is not increased in the step of filling the gap 26 in the panel assembly 40 with the liquid material 162, so that the first conductive panel member 18 is surely prevented from being deformed in a direction toward the second conductive panel member 24 during the liquid filling process. Therefore, it is possible to surely and entirely fill the gap 26 between the conductive panel members 18, 24 of the panel assembly 40 with the liquid material 162, without narrowing the gap 26 in the liquid filling step. Consequently, the panel-type peripheral device 10, as a finished product after being fully filled with the liquid material, is provided with the first conductive panel member 18, acting as the upper detecting element of a touch panel, inherently having a superior flatness over the whole surface thereof, and thus can provide a touch panel ensuring little distortion in a transmitted image as well as an accurate and stable entering operation.

In the above-described liquid pouring system 130, the center wall 134 of the box-shaped support unit 136 may be constituted as a partition wall for hermetically sealing between one side (i.e., the liquid-material storing vessel 148) and the other side (i.e., the pressure regulating chamber 150) of the center wall. In this arrangement, a pump unit for evacuation and a throttle valve for pressure release are connected to the liquid-material storing vessel 148 independently of the pressure regulating chamber 150. According to this arrangement, it is possible to adjust the liquid material 162 filled in the panel assembly 40 to an optimum volume, by increasing the internal pressure of the pressure regulating chamber 150 to a desired level, after the gap 26 in the panel assembly 40 is filled with the liquid material 162.

Also, in the liquid pouring system 130, the center wall 134 of the box-shaped support unit 136 may be provided with a plurality of through openings, each of which allows a part of each of plural panel assemblies 40 to be fitted thereto, as already described with reference to FIGS. 12 and 13. In this configuration, it is possible to simultaneously fill the gaps 26 of the respective panel assemblies 40, the number of which corresponds to the number of the through openings, with the liquid material 162.

It will be appreciated for a person with ordinary skill in the art that the panel-type peripheral device producing methods, the panel support units and the liquid pouring systems, according to the above-described various embodiments of the present invention, may be significantly effectively applied to a liquid material pouring process, not only for a liquid-sealing touch panel, but also for various other liquid-sealing panel-type peripheral devices, such as a liquid crystal display using a resinous-film substrate, wherein at least one of the conductive panel members of a panel assembly has a flexibility for permitting a relatively easy deformation due to a pressure fluctuation in the outside environment. In any cases, the panel-type peripheral device thus produced has a high-level functionality while any bending of the conductive panel member is eliminated.

Incidentally, in the panel-type peripheral device 10 of the above-described embodiment, the passage 32 for pouring a liquid material, formed between the first and second conductive panel members 18, 24 adjacent to the adhesive layer 28, linearly extends and has a uniform cross-section between an interior port opening to the gap 26 between the conductive panel members 18, 24 and an exterior port opening to the outside environment. The passage 32 of this shape is capable of being easily formed by a cut-out portion of the double-coated tape constituting the adhesive layer 28. However, the conductive panel members 18, 24 are not fixed to each other in the region of the passage 32, so that it may be difficult to securely hold the first conductive panel member 18 including the flexible resinous-film insulating substrate 14 in the vicinity of the passage 32 under a sufficient tension.

Figure 17:
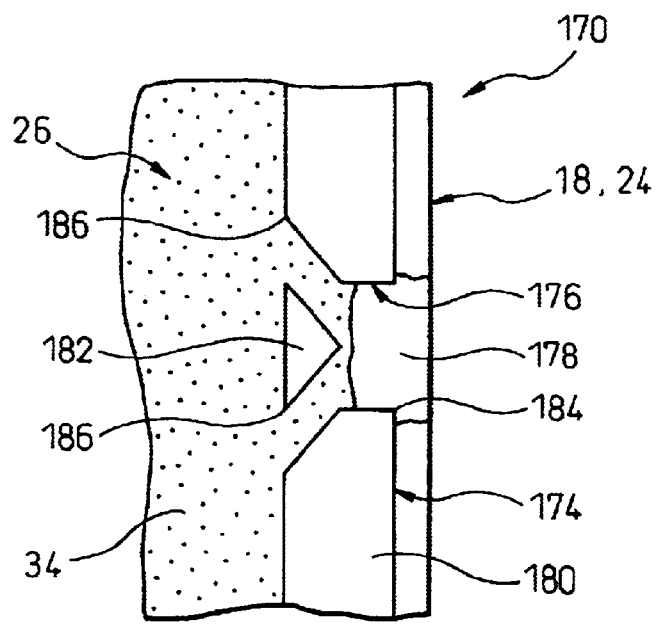
FIG. 17 is an enlarged plan view showing a major part of a panel-type peripheral device according to an yet other embodiment of the present invention.
Figure 18:
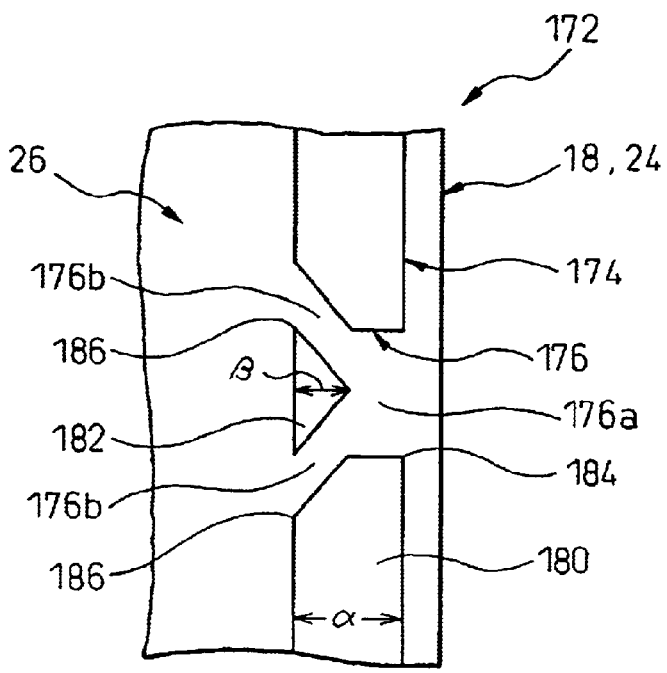
FIG. 18 is an enlarged plan view showing a major part of a panel assembly constructing the panel-type peripheral device of FIG. 17.

FIGS. 17 and 18 show, in an enlarged manner, major parts of a panel-type peripheral device 170 and a panel assembly 172 as an empty or unfilled peripheral device, respectively, according to a yet further embodiment of the present invention for solving the above problems. The panel-type peripheral device 170 and the panel assembly 172 may have constitutions substantially identical to the panel-type peripheral device 10 and the panel assembly 40 as described, except for an adhesive layer 174 and a passage 176 adjacent thereto, so that the corresponding components are designated by common reference numerals and descriptions thereof are not repeated.

In the panel-type peripheral device 170, the first and second conductive panel members 18, 24 are mutually fixed, one on top of the other, by a strip-shaped adhesive layer 174 provided to extend along the outer peripheries of the conductive panel members 18, 24. The adhesive layer 174 is made of, e.g., a pressure sensitive adhesive double-coated tape formed into a rectangular frame shape and having a predetermined thickness. One passage 176 is formed adjacent to the adhesive layer 174 as, e.g., a cut-out portion of the pressure sensitive adhesive double-coated tape, for communicating the gap 26 between the conductive panel members 18, 24 to an environment outside of the panel-type peripheral device 170. The adhesive layer 174 serves, in addition to a function for fixing the conductive panel members, to hermetically seal the gap 26 between the conductive panel members 18, 24 against the outside environment at a region other than the passage 176. A liquid material 34, having a predetermined function, is filled and sealed in the gap 26 between the conductive panel members 18, 24. The passage 176 is sealed up with a sealant (e.g., an adhesive) 178 after the liquid material 34 is poured into the gap 26.

The adhesive layer 174 includes a frame-shaped major part 180 continuously extending in both sides of the passage 176, and a triangle minor part 182 disposed in the passage 176 separately from the major part 180. The minor part 182 has a transverse width $\beta$ smaller than a transverse width $\alpha$ of the major part 180, so as to bifurcate the passage 176 on a side adjacent to the gap 26. As a result, the bifurcated passage 176 is provided with one exterior port 184 opening to the outside environment and two interior ports 186 independently opening to the gap 26, each interior port 186 having an area smaller than the exterior port 184. In the illustrated embodiment, the passage 176 includes a main conduit 176a linearly extending with a uniform cross-section between the exterior port 184 and a midway of the transverse width a of the major part 180 of the adhesive layer 174, and a pair of branch conduits 176b linearly extending in a symmetrically oblique manner with respective uniform cross-sections between the end of the main conduit 176a and the respective interior ports 186. Consequently, each interior port 186 is provided with an opening area generally one half of that of the exterior port 184.

Thus, in the panel-type peripheral device 170, the passage 176 is shaped into a bifurcated form having one exterior port 184 opening to the outside environment and two interior ports 186 independently opening to the gap 26, each interior port 186 having an area smaller than the exterior port 184, by placing the small minor part 182 in the passage 176 separately from the major part 180 of the adhesive layer 174, so that the non-adhering portion of the conductive panel members 18, 24, which are not fixed to each other in the passage 176, is distributed into two small portions adjacent to the gap 26. Consequently, it is possible to securely hold the first conductive panel member 18 including the flexible resinous-film insulating substrate 14 in the vicinity of the passage 176 (especially, near the gap 26) under a sufficient tension. Accordingly, in the case where the panel-type peripheral device 170 is constituted as a touch panel, the first conductive panel member 18 acting as the upper detecting element to be pressed for operation is securely held while a uniform tension is entirely applied thereto, so that it is possible to ensure that data is accurately and stably entered, irrespective of a pressed position on the first conductive panel member 18. Moreover, a passage sealing operation performed after the liquid-material filling process requires only the application of the sealant 178 into one external port 184 and, thus, is not troublesome in comparison with a passage sealing operation in the conventional panel-type peripheral device.

In particular, in the panel-type peripheral device 170, the opening area of the exterior port 184 defined at the upstream end of the passage 176, as seen in a liquid pouring direction, is substantially identical to the total opening area of two interior ports 186 defined at the downstream end, so that the time required for the filling operation of the liquid material 34 is not substantially increased. From this viewpoint, three or more small minor parts of the adhesive layer 174 may be provided in the downstream side of the passage 176 so as to form three or more branch conduits or interior ports, provided that the total opening area of the interior ports is substantially identical to the opening area of the exterior port 184.

Figure 19:
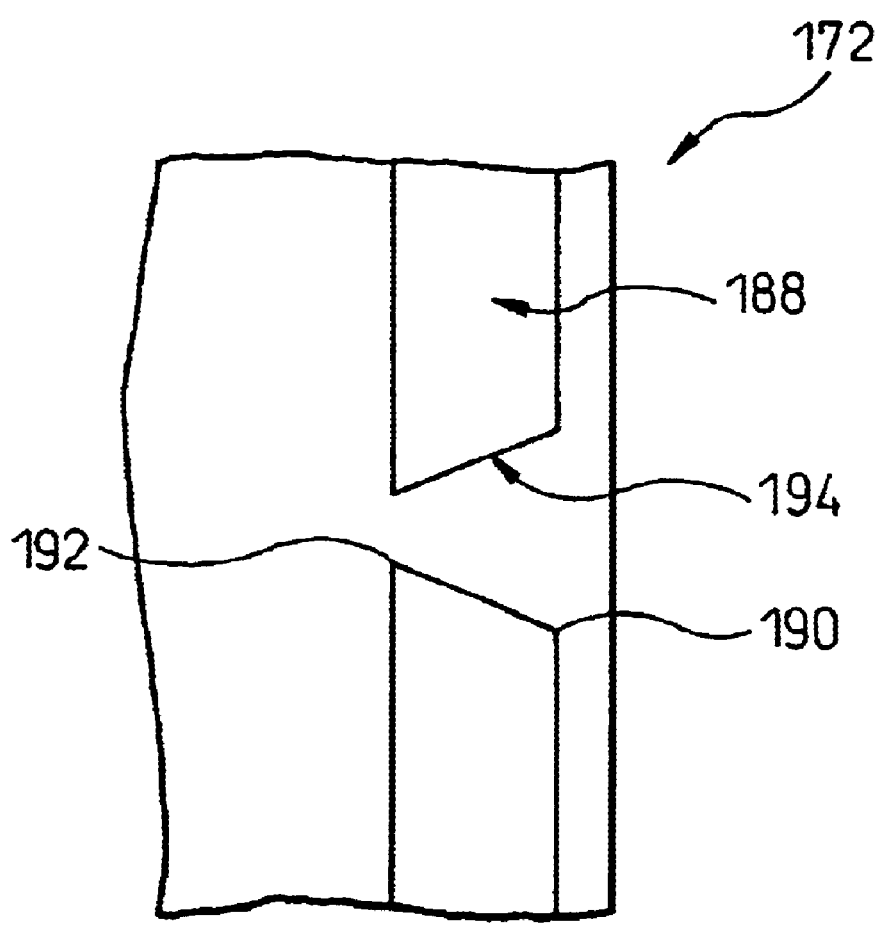
FIG. 19 is an enlarged plan view showing a major part of a modified panel assembly.

Also, in the case where it is possible to prevent the time required for the liquid-material filling process from increasing over an allowable level, a tapered passage 194 with a cross-section gradually reduced from an exterior port 190 to an interior port 192, as shown in FIG. 19, may be formed by using an adhesive layer 188 including only a frame-shaped major part. Furthermore, a plurality of passages 176 and/or 194 may be formed in the panel-type peripheral device 170, provided that the passage sealing operation performed after the liquid-material filling process does not become troublesome.

While the invention has been particularly shown and described with reference to preferred embodiments thereof, it will be understood by those skilled in the art that various changes and modifications may be made without departing from the spirit and scope of the following claims.

What is claimed is:

1. A method of producing a panel-type peripheral device including a pair of conductive panel members, each conductive panel member being provided with an insulating substrate and a conductive film on a first side of said insulating substrate, comprising:

providing a panel assembly including said pair of conductive panel members fixed to each other with respective conductive films thereof oppositely facing to each other through a gap defined therebetween, said panel assembly having a passage for communicating said gap with an environment outside of said panel assembly, said gap being hermetically sealed against the environment at a region other than said passage;

providing a support member having a rigidity higher than that of at least one of said conductive panel members of said panel assembly, said support member including a support surface larger than a second side of said insulating substrate, opposite to said first side, of said at least one of said conductive panel members;

providing a receptacle accommodating a liquid material;

placing said panel assembly, said support member and said receptacle in a common environment;

securely arranging said support member over and adjacent to said at least one of said conductive panel members of said panel assembly with said support surface oppositely facing to said second side of said insulating substrate;

depressurizing said common environment while said passage of said panel assembly is exposed to said common environment, to evacuate said gap in said panel assembly;

immersing said passage of said panel assembly into said liquid material in said receptacle under said common environment as depressurized; and increasing a pressure of said common environment as depressurized, to cause a flow of said liquid material from said receptacle into said gap in said panel assembly through said passage, and to fill said gap with said liquid material, without directly applying said pressure of said common environment onto said at least one of said conductive panel members arranged adjacent to said support member.

2. A method according to claim 1, wherein the step of securely arranging said support member over and adjacent to said at least one of said conductive panel members of said panel assembly includes defining a second gap between said support surface of said support member and said second side of said insulating substrate of said at least one of said conductive panel members, wherein the depressurizing said common environment includes communicating said second gap to said common environment, and wherein the increasing the pressure of said common environment includes hermetically sealing said second gap against said common environment.

3. A panel support unit comprising:

said support member provided in a method according to claim 2;

a vent hole for communicating said second gap with said common environment; and a valve member capable of opening and closing said vent hole in response to a pressure fluctuation in said common environment.

4. A method according to claim 1, wherein said at least one of said conductive panel members of said panel assembly, securely arranged over and adjacent to said support member, has a flexibility permitting a relatively easy deformation due to a pressure fluctuation in said common environment.

5. A method according to claim 4, wherein said panel-type peripheral device has a configuration of a touch panel including a pair of detecting elements as said pair of conductive panel members, each detecting element being provided with a transparent insulating substrate and a transparent conductive film on a first side of said insulating substrate, wherein at least one of the detecting elements of said panel assembly, securely arranged over and adjacent to said support member, has a flexibility permitting a relatively easy deformation due to a pressure fluctuation in said common environment, and wherein said liquid material is a transparent insulating liquid material.

6. A touch panel produced by a method according to claim 5.

7. A panel-type peripheral device produced by a method according to claim 1.

8. A panel support unit comprising said support member provided in a method according to claim 1.

9. A panel support unit according to claim 8, further comprising a second support member cooperating with said support member to securely support said panel assembly.

10. A method of producing a panel-type peripheral device including a pair of conductive panel members, each conductive panel member being provided with an insulating substrate and a conductive film on a first side of said insulating substrate, comprising:

providing a panel assembly including said pair of conductive panel members fixed to each other with respective conductive films thereof oppositely facing to each other through a gap defined therebetween, said panel assembly having a passage for communicating said gap with an environment outside of said panel assembly, said gap being hermetically sealed against the environment at a region other than said passage, at least one of said conductive panel members having a flexibility permitting a relatively easy deformation due to a pressure fluctuation in said environment;

providing a partition wall including a through opening, into which a part of said panel assembly is capable of being fitted in a hermetically sealed manner;

fitting said part of said panel assembly into said through opening of said partition wall in a hermetically sealed manner, such that said passage of said panel assembly opens to one side of said partition wall, and major parts of said conductive panel members of said panel assembly are located in another side of said partition wall;

placing a liquid material in said one side of said partition wall;

immersing an open portion of said passage of said panel assembly, fitted into said through opening of said partition wall, into said liquid material;

increasing a pressure of an environment in said other side of said partition wall to deform said at least one of said conductive panel members of said panel assembly, to evacuate said gap in said panel assembly; and decreasing a pressure of said environment in said other side of said partition wall to deform said at least one of said conductive panel members of said panel assembly, to cause a flow of said liquid material from said one side of said partition wall into said gap in said panel assembly through said passage, and to fill said gap with said liquid material.

11. A method according to claim 10, wherein said partition wall includes a plurality of through openings, into which respective parts of a plurality of panel assemblies are capable of being fitted in a hermetically sealed manner, and wherein said gap of each of said panel assemblies is simultaneously filled with said liquid material.

12. A panel-type peripheral device produced by a method according to claim 10.

13. A liquid pouring system comprising said partition wall provided in a method according to claim 10.

14. A liquid pouring system according to claim 13, further comprising a liquid-material storing vessel provided in said one side of said partition wall, a pressure regulating chamber provided in said other side of said partition wall, and a support mechanism for securely supporting said panel assembly in a state where said part of said panel assembly is fitted into said through opening of said partition wall.

15. A method according to claim 10, wherein said panel-type peripheral device has a configuration of a touch panel including a pair of detecting elements as said pair of conductive panel members, each detecting element being provided with a transparent insulating substrate and a transparent conductive film on a first side of said insulating substrate, and wherein said liquid material is a transparent insulating liquid material.

16. A touch panel produced by a method according to claim 15.

17. A method of producing a panel-type peripheral device including a pair of conductive panel members, each conductive panel member being provided with an insulating substrate and a conductive film on a first side of said insulating substrate, comprising:

providing a panel assembly including said pair of conductive panel members fixed to each other with respective conductive films thereof oppositely facing to each other through a gap defined therebetween, said panel assembly having a passage for communicating said gap with an environment outside of said panel assembly, said gap being hermetically sealed against the environment at a region other than said passage;

providing a wall including a through opening, into which a part of said panel assembly is capable of being fitted;

fitting said part of said panel assembly into said through opening of said wall, in such a manner that said passage of said panel assembly opens to one side of said wall;

depressurizing an environment in both sides of said wall into a vacuum condition;

placing a liquid material in said one side of said wall to immerse an open portion of said passage of said panel assembly into said liquid material;

flowing said liquid material from said one side of said wall into said gap in said panel assembly through said passage by a function of gravity, to fill said gap with said liquid material.

18. A method according to claim 17, wherein said wall includes a plurality of through openings, into which respective parts of a plurality of panel assemblies are capable of being fitted, and wherein said gap of each of said panel assemblies is simultaneously filled with said liquid material.

19. A method according to claim 17, wherein said wall is capable of closing between said one side and said other side in a hermetically sealed manner, and further comprising a step of varying a pressure of said environment in said other side of said wall, after said gap of said panel assembly is filled with said liquid material, to adjust a volume of said liquid material in said gap.

20. A panel-type peripheral device produced by a method according to claim 17.

21. A liquid pouring system comprising said wall provided in a method according to claim 17.

22. A liquid pouring system according to claim 21, further comprising a liquid-material storing vessel provided in said one side of said wall, a pressure regulating chamber continuously formed around said wall and said liquid-material storing vessel, and a support mechanism for securely supporting said panel assembly in a state where said part of said panel assembly is fitted into said through opening of said wall.

23. A method according to claim 17, wherein said panel-type peripheral device has a configuration of a touch panel including a pair of detecting elements as said pair of conductive panel members, each detecting element being provided with a transparent insulating substrate and a transparent conductive film on a first side of said insulating substrate, and wherein said liquid material is a transparent insulating liquid material.

24. A touch panel produced by a method according to claim 23.

25. A panel-type peripheral device comprising:
- a pair of insulating substrates spaced from and opposed to each other;
- a pair of conductive films respectively formed on opposed surfaces of said insulating substrates to face oppositely to each other through a gap;
- an adhesive sealing member for sealing said gap against an outside environment and fixing said insulating substrates with each other; and
- a liquid material filled and sealed in said gap;
- wherein said adhesive sealing member includes:
    - a strip-shaped adhesive layer laminated on said opposed surfaces of said insulating substrates to extend along outer peripheries of said insulating substrates;
    - at least one passage formed adjacent to said adhesive layer for pouring said liquid material into said gap;
    - a sealant for sealing said at least one passage;
    - each of said at least one passage being provided with one exterior port opening to the outside environment and at least one interior port independently opening to said gap, each interior port having an opening area smaller than said exterior port.

* * * * *

UNITED STATES PATENT AND TRADEMARK OFFICE
CERTIFICATE OF CORRECTION

PATENT NO. : 6,777,631 B2
DATED : August 17, 2004
INVENTOR(S) : Tooru Muraoka et al.

It is certified that error appears in the above-identified patent and that said Letters Patent is hereby corrected as shown below:

Column 24,
Line 39, delete "step of"

Signed and Sealed this

Fourth Day of January, 2005

JON W. DUDAS
*Director of the United States Patent and Trademark Office*